(12) United States Patent
Loh et al.

(10) Patent No.: US 9,768,822 B1
(45) Date of Patent: Sep. 19, 2017

(54) SMART PHONE CARRYING CASE WITH STAND

(71) Applicant: Forever Holdings, Inc, Woodbury, MN (US)

(72) Inventors: Shung Loh, Woodbury, MN (US); Ho Yin Lee, Woodbury, MN (US); Ping Hay Heun, Woodbury, MN (US)

(73) Assignee: Forever Holdings, Inc., Woodbury, MN (US)

( * ) Notice: Subject to any disclaimer, the term of this patent is extended or adjusted under 35 U.S.C. 154(b) by 0 days.

(21) Appl. No.: 15/206,387

(22) Filed: Jul. 11, 2016

(51) Int. Cl.
| H04M 1/00 | (2006.01) |
| H04B 1/3888 | (2015.01) |
| A45C 11/00 | (2006.01) |
| H04M 1/02 | (2006.01) |
| H04M 1/03 | (2006.01) |

(52) U.S. Cl.
CPC ............ *H04B 1/3888* (2013.01); *A45C 11/00* (2013.01); *H04M 1/0206* (2013.01); *H04M 1/03* (2013.01); *A45C 2011/002* (2013.01); *A45C 2011/003* (2013.01); *A45C 2200/15* (2013.01)

(58) Field of Classification Search
USPC ..................... 455/550.1, 556.1, 575.1, 575.8
See application file for complete search history.

(56) References Cited

U.S. PATENT DOCUMENTS

| 8,418,852 | B2 | 4/2013 | Ziemba |
| 8,504,127 | B2 | 8/2013 | Altschul et al. |
| 8,522,965 | B1* | 9/2013 | Hsiung ............... H04B 1/3888 206/320 |
| 8,759,675 | B2 | 6/2014 | Rajeswaran et al. |
| 8,942,773 | B2 | 1/2015 | Wu |
| 8,989,826 | B1 | 3/2015 | Connolly |
| 9,049,283 | B1 | 6/2015 | Kim |
| 9,281,858 | B2 | 3/2016 | Fathollahi |
| 2010/0072334 | A1* | 3/2010 | Le Gette ............. F16M 11/041 248/176.3 |
| 2011/0077061 | A1 | 3/2011 | Danze et al. |
| 2011/0294542 | A1 | 12/2011 | Ray et al. |
| 2012/0147536 | A1 | 6/2012 | Sa |
| 2013/0079066 | A1* | 3/2013 | Chan ...................... H04M 1/04 455/575.1 |
| 2013/0220847 | A1 | 8/2013 | Fisher et al. |
| 2014/0016217 | A1 | 1/2014 | Rayner |
| 2014/0066142 | A1 | 3/2014 | Gipson |
| 2014/0066143 | A1 | 3/2014 | Choi |
| 2014/0128132 | A1 | 5/2014 | Cox, III |
| 2014/0263939 | A1 | 9/2014 | Rinner |
| 2014/0378193 | A1 | 12/2014 | Biancamano et al. |
| 2015/0011265 | A1 | 1/2015 | Walsh, Jr. |
| 2015/0052854 | A1* | 2/2015 | Diebel .................. A45C 11/00 53/473 |
| 2015/0069099 | A1* | 3/2015 | Diebel .................. A45C 11/00 224/196 |
| 2015/0129095 | A1 | 5/2015 | Marin |
| 2015/0230570 | A1 | 8/2015 | Kim |
| 2016/0014922 | A1 | 1/2016 | Banerjee et al. |

* cited by examiner

*Primary Examiner* — Fayyaz Alam
(74) *Attorney, Agent, or Firm* — Haugen Law Firm PLLP

(57) ABSTRACT

A protective carrying case for a mobile electronic device is provided having a concealed storage compartment. The concealed compartment may store credit cards, identification cards and other personal articles. The case also includes an integrated stand that enables a user to prop the mobile device at a desired angle.

20 Claims, 28 Drawing Sheets

SMART PHONE CARRYING CASE WITH STAND

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

The present invention relates generally to protective cases for electronic devices. More particularly, the present invention relates to a non-intrusive mobile phone protective case having a support stand and concealed compartment for use as a mobile phone carrying case.

BACKGROUND

Mobile electronic devices, such as cellular phones, tablets and laptops often include an external housing that may shatter or sustain damage from an impact. The damage from impact may result in a cracked screen, scratches on a finished surface, and/or failed or malfunctioning electrical components. Complimentary casings have been provided to reduce potential damage from impact. However, in the past, these complimentary casings have been bulky, reducing the overall aesthetic appearance of the mobile device. Further, the increased bulk of these cases contradicts a consumer's desire for a compact mobile (lightweight and small sized) device. Additionally, there may be a desire to increase the functionality of the case by adding practical structures to the case, however these added structures typically further add too much to the bulk and weight of the case. An increase in bulk or weight may result in a cumbersome and less desirable case. Accordingly, there is a desire to minimize the bulkiness and weight of protective cases for mobile devices while maintaining impact protection and additional versatility.

SUMMARY

Embodiments according to aspects of the present invention provide a covering for an electronic device that absorbs shock while also including a concealed storage compartment. The protective covering includes a hard outer shell and an inner flexible sheath. A multi hinged panel is fixed to the outer shell and may be utilized to conceal the storage compartment and may also be altered to prop up or stand the electronic device at a desired angle.

The protective case in accordance with aspects of the present invention may include an outer shell or rigid body, a flexible sheath or pliable body, and a hinged panel stand. The pliable body has a first cavity formed into a first side of the pliable body and a second cavity formed into a second opposing side of the pliable body. The first and second opposing cavities are separated by a dividing wall, wherein the first cavity is adapted for receiving an electronic device and the second cavity is adapted for receiving one or more articles. The rigid body is fixed or coupled to the second side of the pliable body. The hinged panel stand has a first end portion fixed to an outer surface of the rigid body and a second free end portion that is adapted to extend over and cover the second cavity of the pliable body. A portion of the hinged panel includes a plurality of hinge joints, allowing the panel to be altered from a flat configuration to a multi fold or triangular configuration.

In embodiments of the invention the protective covering includes buffering slotted corners formed in the pliable body. Further, magnets and metal strips may be associated with the hinged panel. The magnets and metal strips act together to retain the hinged panel in either a flat, concealing manner or a folded stand forming manner. The protective covering may further include flanges extending inward from the second cavity sidewalls and block outer access to a portion of the second cavity. The flanges restrict objects placed in the second cavity from falling out of the storage compartment formed by the cavity and flanges. At least one of the sidewalls of the second cavity is sloped or ramped. The ramp may be utilized to slide credit cards, for example, out of the storage compartment. Additionally, cushioning members may be formed in the pliable body. The cushion members may be adapted to align with a camera aperture of the electronic device.

In accordance with aspects of the invention, an embodiment of the invention includes a protective covering for a mobile electronic device configured to be user removable from the mobile device. A suitable mobile electronic device includes a thickness that is defined as the distance between a front face and a back face of the mobile device, and a perimeter that is defined by a top side, bottom side, right side, and left side extending between the front and back faces, and corners defined at the intersecting regions of the sides. The protective covering includes a rigid body, integrated pliable body and a hinged panel. The rigid body is defined by inner and outer surfaces of the rigid body, wherein the inner surface includes a perimeter edging extending upward from the inner surface and a plurality of tabs extending inward from the perimeter edging toward a center of the first rigid body. The perimeter edging of the rigid body is dimensioned to engage sides of the pliable body and the rigid body further includes an opening extending through the rigid body between the inner and outer surfaces of the rigid body. The opening formed in the rigid body is positioned to align with a cavity of the pliable body. The pliable body is defined by inner and outer surfaces of the pliable body and is dimensioned to both cover a majority of the back face of the mobile device and extend around a majority of the perimeter of the mobile device. The pliable body further includes a first cavity formed into the inner surface of the pliable body and a second cavity formed into the outer surface of the pliable body. The second cavity aligns with the opening extending through the rigid body. Further, the first cavity is adapted for receiving the mobile device and the second cavity is adapted for receiving one or more articles. The inner surface and outer surface of the pliable body oppose each other and the first and second cavity are separated by a dividing wall. The hinged panel has multiple folds formed in the panel and has a first end fixed to the rigid body. The hinged panel is dimensioned to cover the opening extending through the rigid body and the second cavity aligned with the rigid body opening.

Embodiments of the invention include a protective covering wherein the pliable body includes one or more control apertures extending through the pliable body that are dimensioned and positioned to allow access to control ports on the mobile device. The pliable body may include sides having slots formed in the sides, wherein the slots are dimensioned and positioned to align and engage with the tabs of the rigid body. Further, the pliable body may have indentations aligned with corners of the mobile device, wherein the indentations are dimensioned to increase a pliability of the pliable body near the corners of the mobile device. The rigid body may be made of a first material that has a first hardness and the second pliable body may be made of a second material that has a second hardness, wherein the first hardness is greater than the second hardness. The pliable body may further include channels formed and extending into the inner surface of the pliable body, wherein the channels are formed to align and extend around at least a portion of a camera aperture of the mobile device. The protective covering may further include magnets or metal strips associated with a second end portion of the hinged panel. Magnets may also be associated with the outer surface of the rigid body. The magnets and metal strip engage the hinged panel to the rigid body in a removable relation. Flanges may be included that block outer access to a portion of the second cavity. The second cavity may include a ramped sidewall and the second cavity may be dimensioned to be slightly larger than a size of a credit card. Those skilled in the art will appreciate that a variety of hinged stands or flaps and access opening configurations may be utilized in accordance with the present invention.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
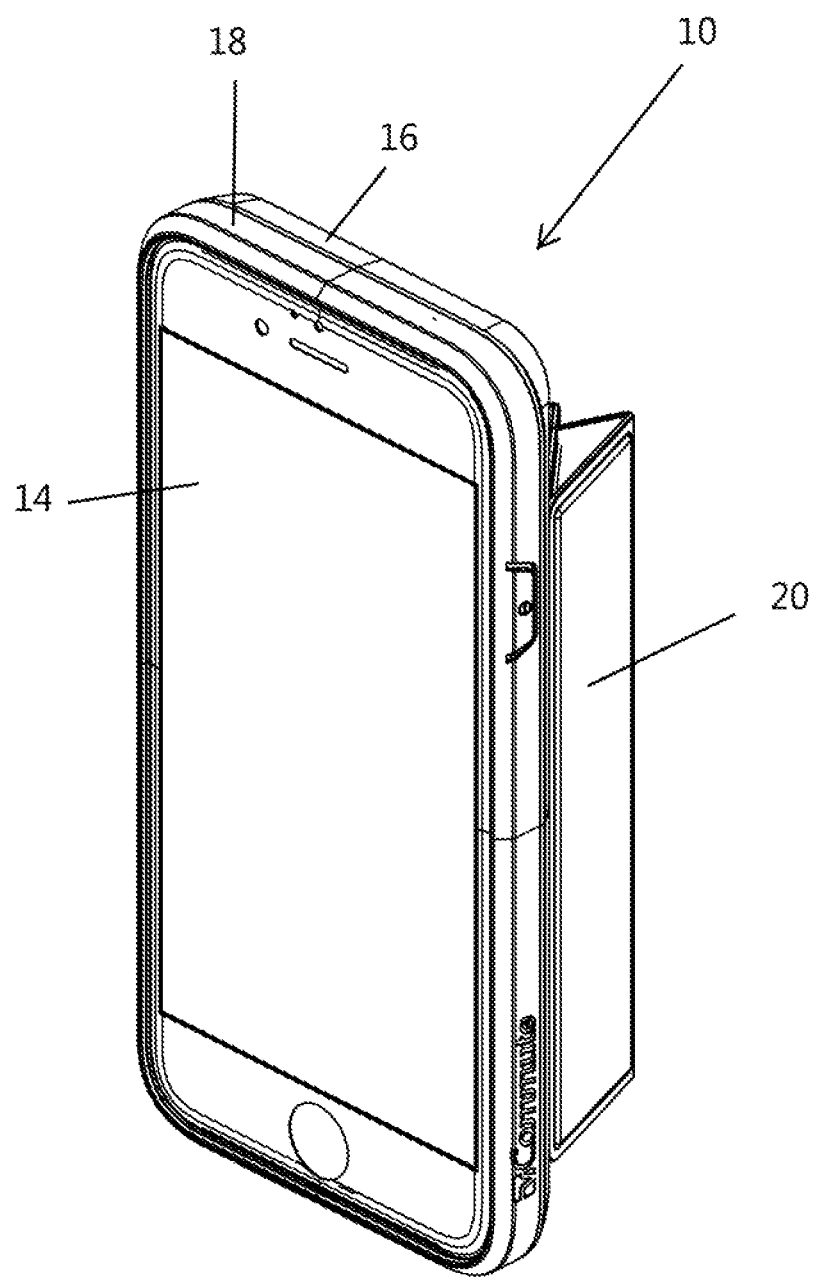
FIG. 1 is a front upper perspective view of a carrying case in accordance with the present invention illustrating a smart phone contained within the carrying case.

The following description provides detail of various embodiments of the invention, one or more examples of which are set forth below. Each of these embodiments are provided by way of explanation of the invention, and not intended to be an undue limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

In an embodiment of the invention a slender and compact protective covering 10 is provided that minimizes the bulkiness and weight of the protective case for mobile device 14 while maintaining impact protection and additional versatility. The protective covering 10 for the mobile electronic device 14 is configured to be user removable from the mobile device, wherein the mobile device includes a thickness that is defined as the distance between a front face and a back face of the mobile device, and a perimeter that is defined by a top side, bottom side, right side, and left side extending between the front and back faces, and corners defined at the intersecting regions of the sides.

In accordance with aspects of the invention the protective covering includes a two piece outer rigid shell 16 and inner shock absorbing pliable body 18. A multi hinged panel 20 is attached to the outer rigid shell 16 that may lay flat against the protective outer shell 16 to conceal a storage compartment 24 formed in the inner pliable body 18. The outer shell 16 is defined by inner and outer surfaces and includes a perimeter protective edging 58 extending upward from the inner surface. A plurality of tabs 56 extend inward from the perimeter edging 58 toward a center of the rigid body 16. Similarly, the pliable body is defined by inner and outer surfaces of the pliable body. The pliable body 18 is dimensioned to cover a majority of the back face of the mobile device 14 and to extend and wrap around a majority of the perimeter of the mobile device. The pliable body 16 includes a first cavity 38 formed into the inner surface of the pliable body and a second cavity 40 formed into the outer surface of the pliable body. Further, the first and second cavity 38 and 40 are separated by a dividing wall 41, wherein the first cavity 38 is adapted for receiving the mobile device and the second cavity 40 is adapted for receiving one or more articles.

The perimeter edging 58 of the rigid body 16 is dimensioned to engage sides 43 of the pliable body 18. The rigid body 16 further includes an opening 26 extending through the rigid body 16 between the inner and outer surfaces of the rigid body. The opening 26 extends through a portion of the rigid body 16 to align with the second cavity 40 of the pliable body 18. The multi hinged panel 20 has multiple hinges or folds 60 formed in the panel 20 and has a first end 64 fixed to the rigid body 16, wherein the panel 20 is dimensioned to cover the opening 26 extending through the rigid body 16.

With reference to the Figures various aspects of the invention will be further described. FIG. 1 illustrates an exemplary mobile electronic device 14 inserted and contained within the protective case or covering 10 of the present invention. Those skilled in the art will appreciate that the length, width and thickness of the components of the protective cover 10 may be modified to accommodate various electronic devices including, without limitation intended, various cell phone makes and models, tablets and laptops. An outer perimeter portion of the pliable shell 18 overlaps the mobile device 14 to retain the mobile device 14 within cavity 38 formed in the pliable shell 18. The panel 20 includes multiple folds or hinges 60 that allow the panel to fold at angles to form a stand. The phone may be propped in an orientation to align the display in a vertical or horizontal orientation and at multiple varying viewing angles.

Figure 2:
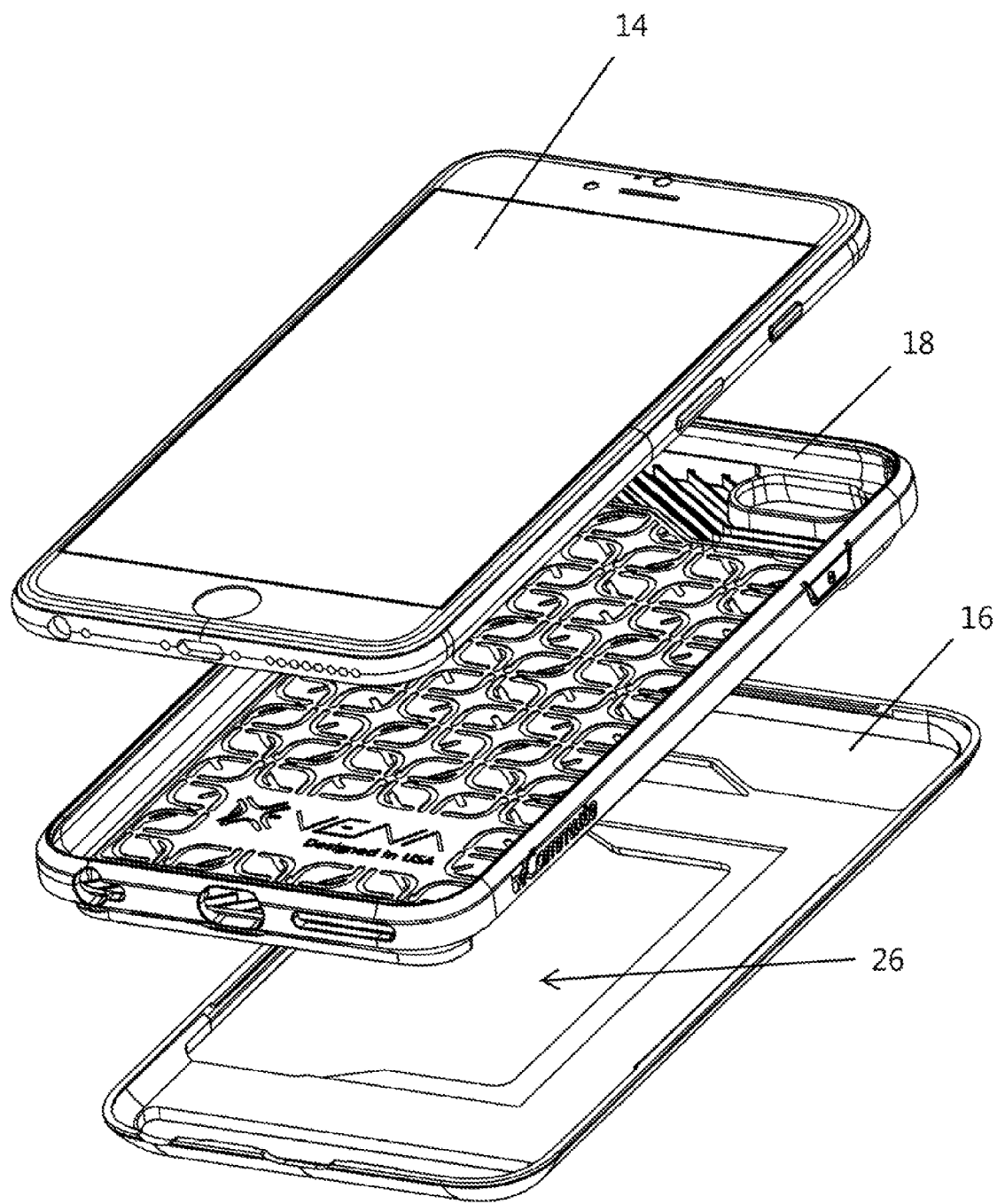
FIG. 2 is an exploded front perspective view of a carrying case in according with the present invention illustrating a smart phone elevated above the inner member or pliable body of the carrying case.
Figure 3:
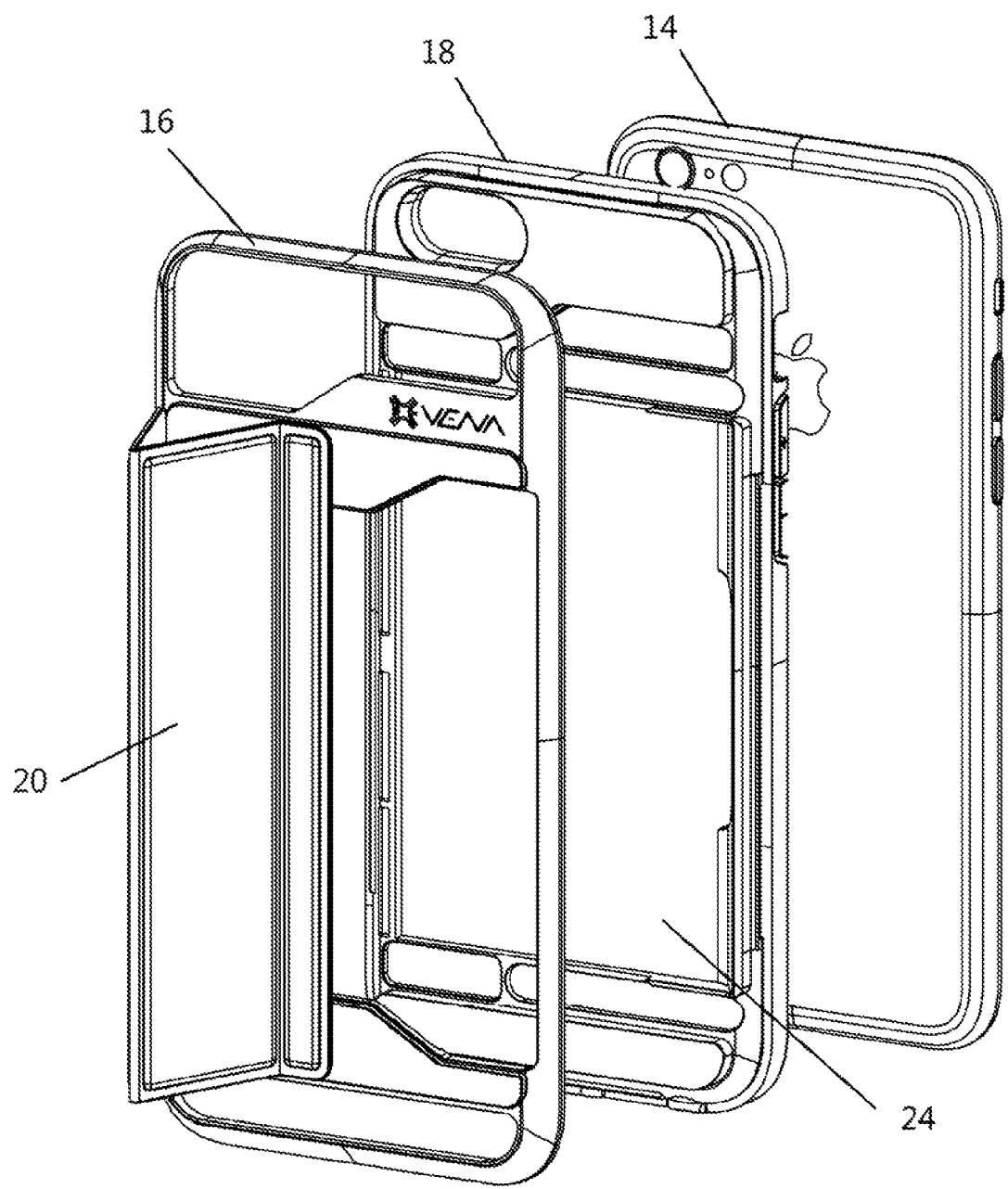
FIG. 3 is an exploded back perspective view of a carrying case in according with the present invention illustrating a smart phone elevated above the inner member or pliable body of the carrying case.
Figure 4:
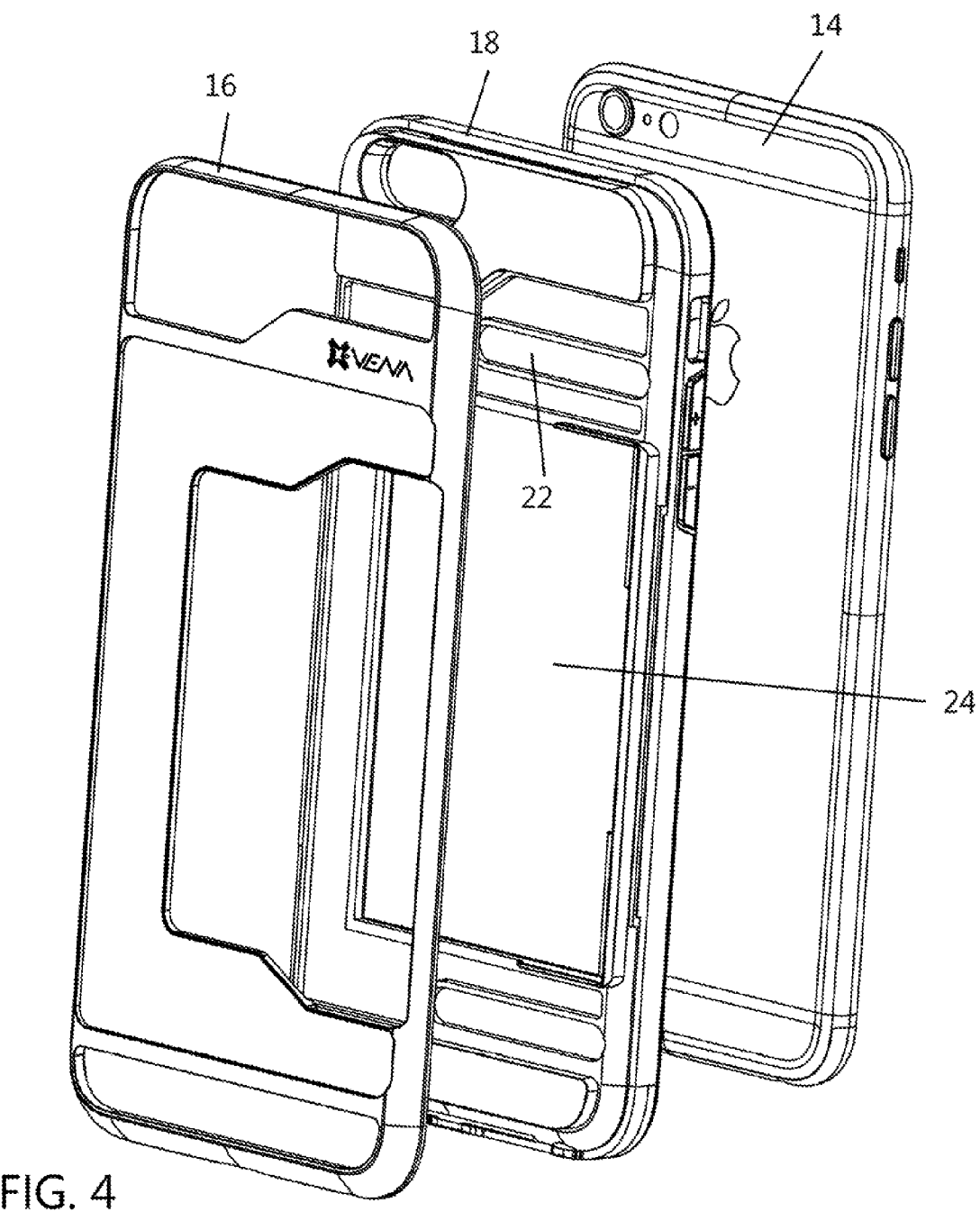
FIG. 4 is an exploded back perspective view of a carrying case in according with the present invention illustrating the hinged flap removed and a smart phone elevated above the inner member or pliable body of the carrying case.

FIGS. 2-4 further illustrates how the phone 14, pliable body 18 and rigid outer body 16 integrate and fit together. The figures show a view of the mobile phone 14 removed from the rigid body 16 and separated from pliable body 18. A storage compartment 24 is created in the second cavity 40 and aligns with the opening 26 formed in the rigid body 16. Magnets 22 are fixed between the rigid cover or body 16 and the pliable body 18. The panel 20 includes metal strips or magnets 62 embedded or associated with the hinged panel. These metal strips or magnets cooperate with magnets 22 to fix the panel in a desired position relative to rigid covering 16. The magnets 22 and magnets or metal strips 62 may also cooperate with other magnets or metal surfaces to couple the protective case 10 to another body. For example, the magnets 62 may cooperate with the metal body of a refrigerator allowing the user to essentially hang the protective case to allow a user to view the display without using hands. Further, a clip having a magnet may be utilized to cooperate with the magnet 60 and clip to a desired surface or structure. For example, without limitation, the user may clip onto an air vent in a vehicle to allow the user to display the mobile device at a desired angle without the need to hold the device.

Figure 5:
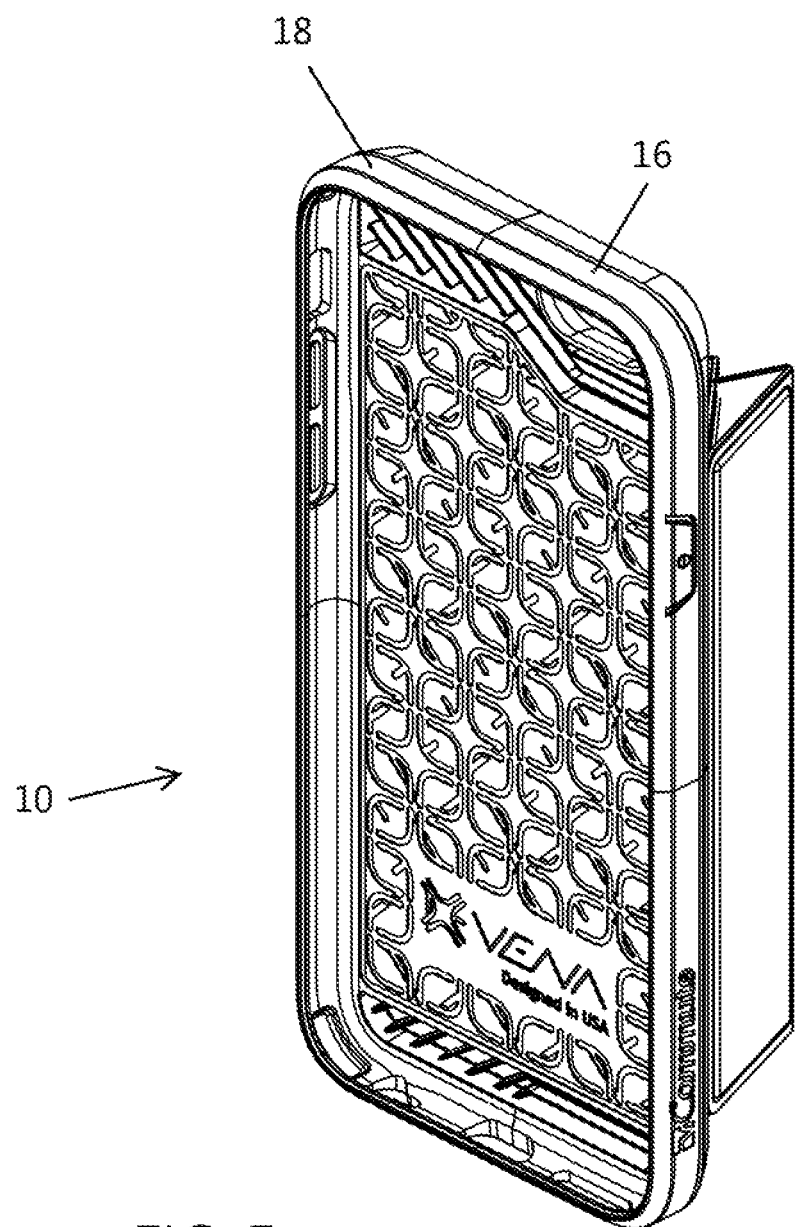
FIG. 5 is a front upper perspective view of a carrying case in accordance with the present invention.
Figure 6:
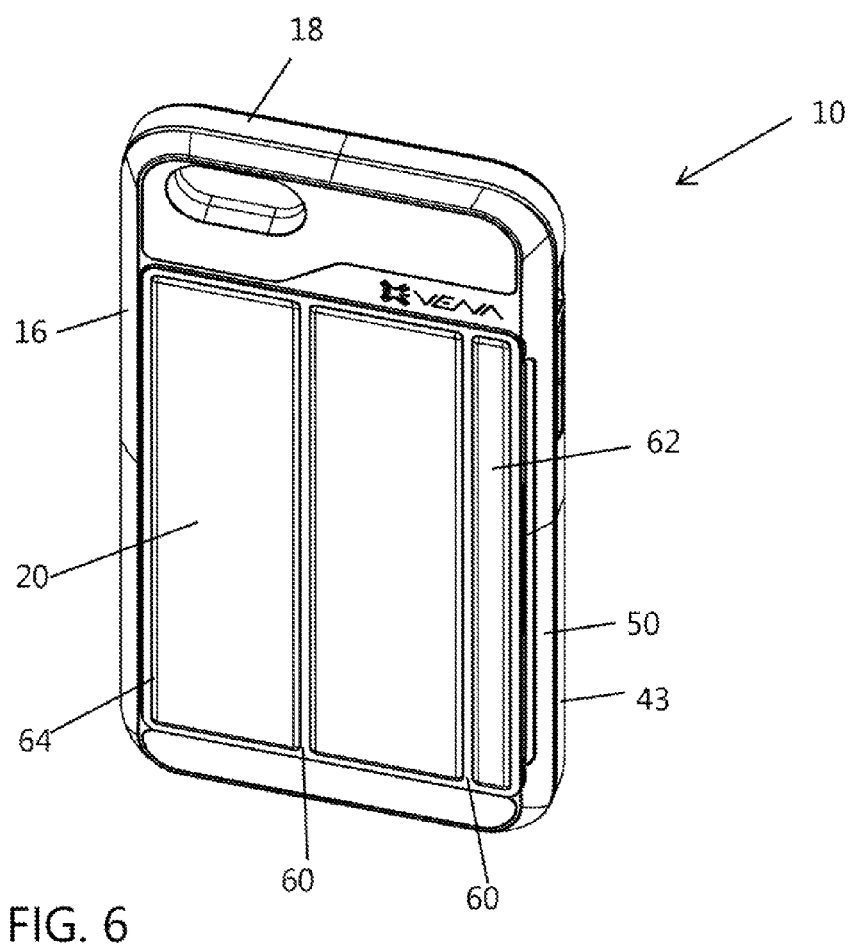
FIG. 6 is a back upper perspective view of the carrying case of the type shown in FIG. 5.

FIGS. 5-6 illustrates the protective case 10 of the invention. The protective case 10 includes a rigid body 16 that has sides 50 that only extend around a portion of the sides 43 of the pliable body 18, thereby providing a slim look and reducing the bulk of the protective case. The panel 20 includes a fixed hinge 64 that attaches the panel to the rigid body 16 and further includes multiple hinge points or folds 60 that allow the panel to be folded and positioned in multiple orientations.

Figure 7:
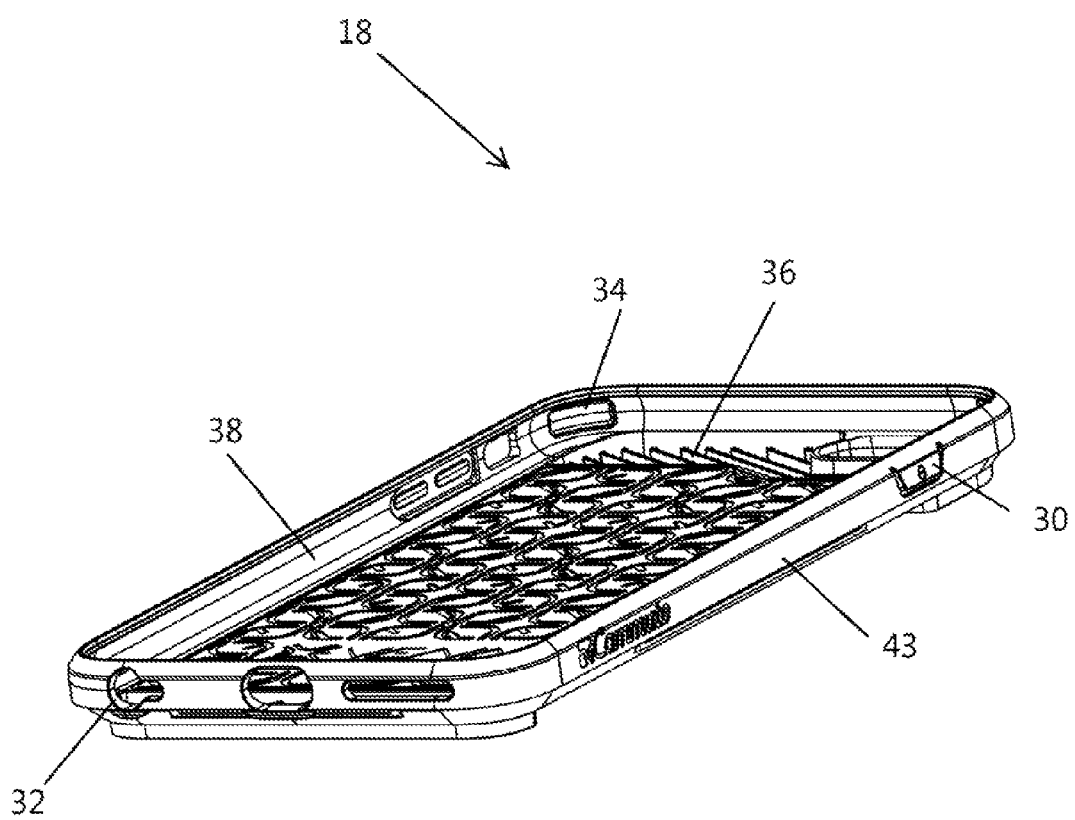
FIG. 7 is a front side perspective view of an inner member or pliable body of the carrying case in accordance with the present invention.
Figure 8:
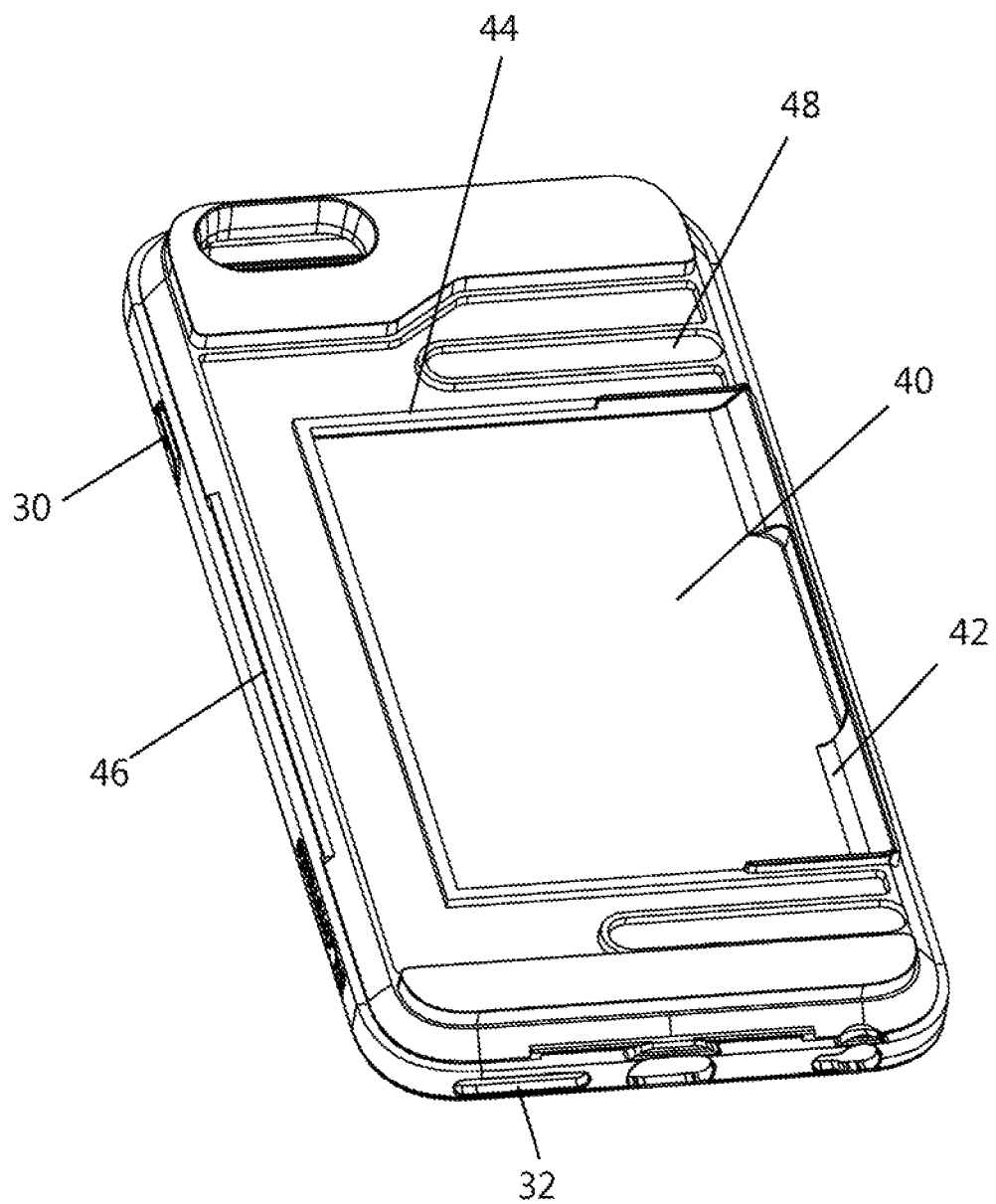
FIG. 8 is a back side perspective view of an inner member of the carrying case in accordance with the present invention.
Figure 9:
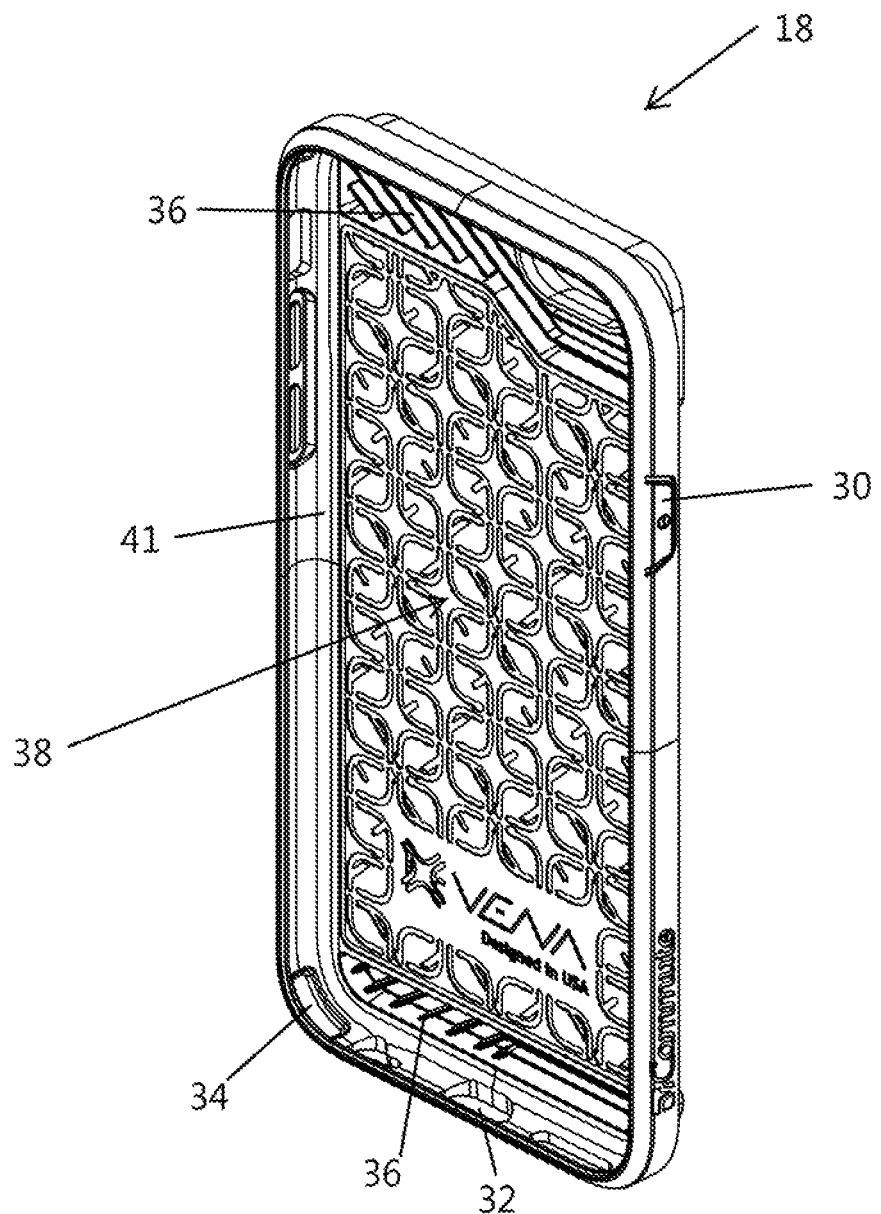
FIG. 9 is a front side perspective view of an inner member of the carrying case in accordance with the present invention.

FIGS. 7-9 illustrates the pliable body 18 of the protective covering or case 10 of the present invention. The pliable body includes control buttons 30 formed into the sides 43 of the pliable body. The control buttons 30 may be sized and positioned to accommodate the size and positioning of control on a particular model of a mobile device 14. The control buttons 30 may include slots or relief so that the buttons easily depress inwards. Control ports 32 are also formed in the sides 43 of the pliable body 18. Similar to the control buttons 30, the position and dimensions of the ports may be formed in the sides 43 to accommodate a particular make and model of the mobile device 14. Further, slots 34 may be formed in interior corners of intersecting sides 43 of the pliable body 18. The slots 34 create an air cushion at the corners between the pliable body 18 and the mobile device 14. Additional slots or cushioning members 36 may be formed in an interior or inner planar surface of the pliable body 18. The cushion members 36 may provide additional shock absorption at critical points on the mobile device 14. For example, the cushioning members may further include members formed in the pliable body 18 that align with a camera aperture of the electronic device 14. The pliable body 18 further includes a cavity 38 formed on an inner side of the body 18 and a second cavity 40 formed on an outer side of the body 18. The cavities 38 and 40 are separated and divided by dividing wall 41. Those skilled in the art will appreciate that the dividing wall may provide complete separation between the first and second cavities 38 and 40 (as shown) or may be partially enclosed, thereby utilizing the back of the mobile device 14 to divide the cavities. The inner cavity 38 is suitable and adapted for receiving a mobile device and the outer cavity 40 is adapted to receive articles. By way of example, credit cards or ID cards 80 may fit within the outer cavity 40. A rim 44 may extend around a portion of the outer cavity 40 to form a stop that restricts card 80 from falling out of the cavity 40. Sides 43 may further include slots adapted for receiving the tabs 56 of the outer shell 16. The slots are sized and dimensioned such that the tabs 56 snap into and fit snuggly in the slots 46. The outer surface of the pliable body may further include recesses 48 that are adapted for receiving magnets 22.

Figure 10:
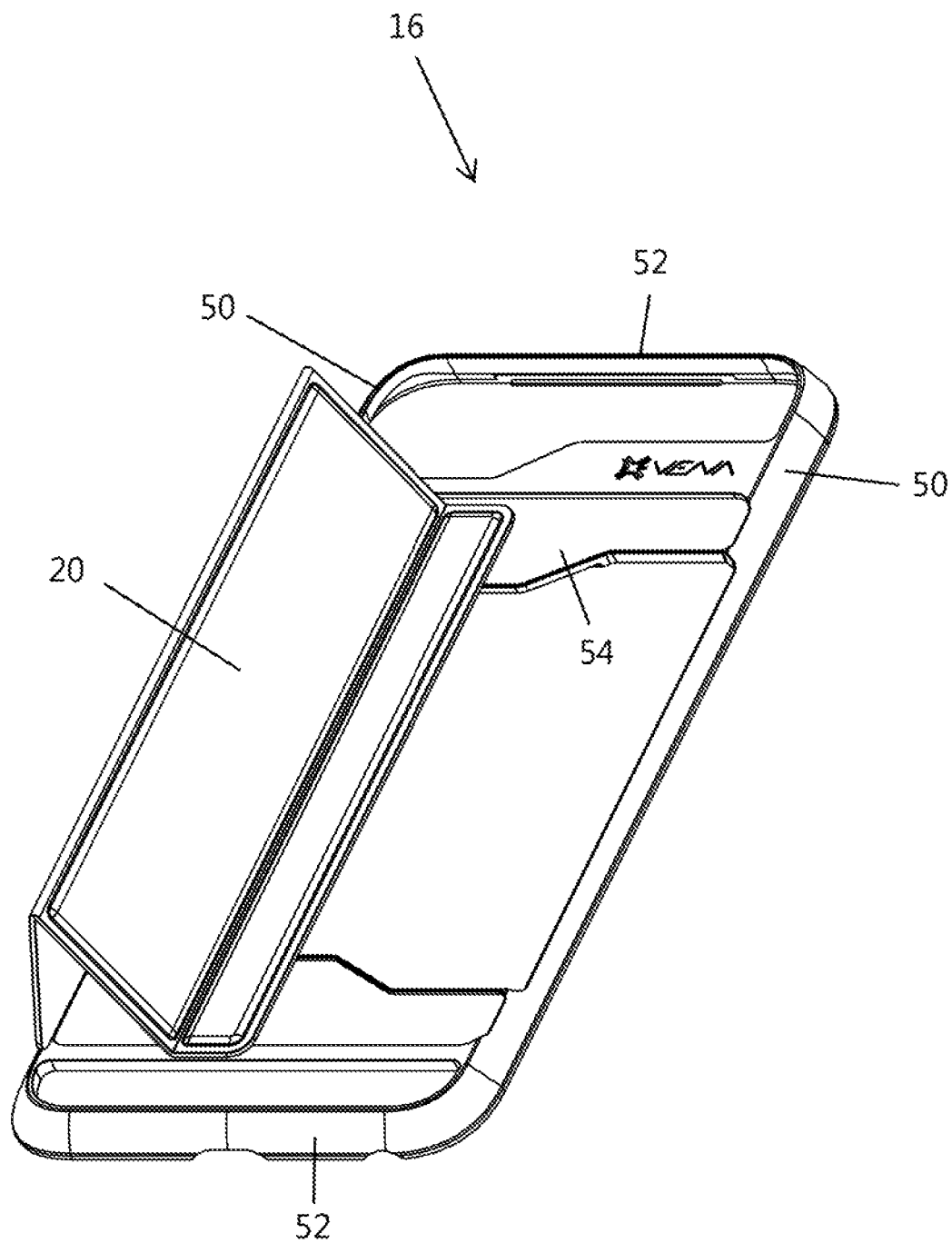
FIG. 10 is a front upper perspective view of an outer member of the carrying case in accordance with the present invention.
Figure 11:
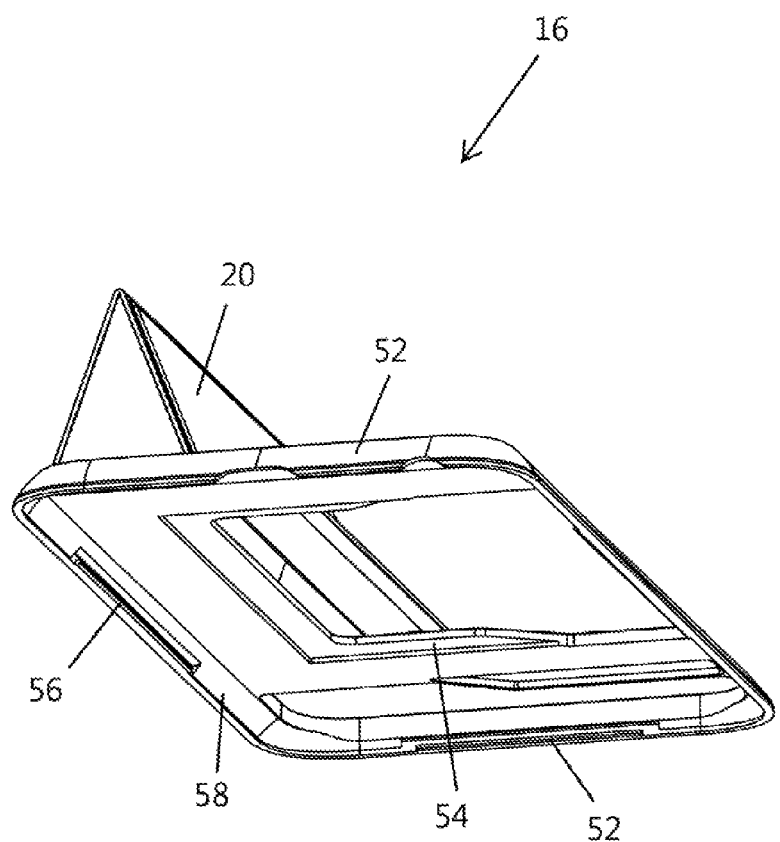
FIG. 11 is a back side perspective view of an outer member of the carrying case in accordance with the present invention.
Figure 12:
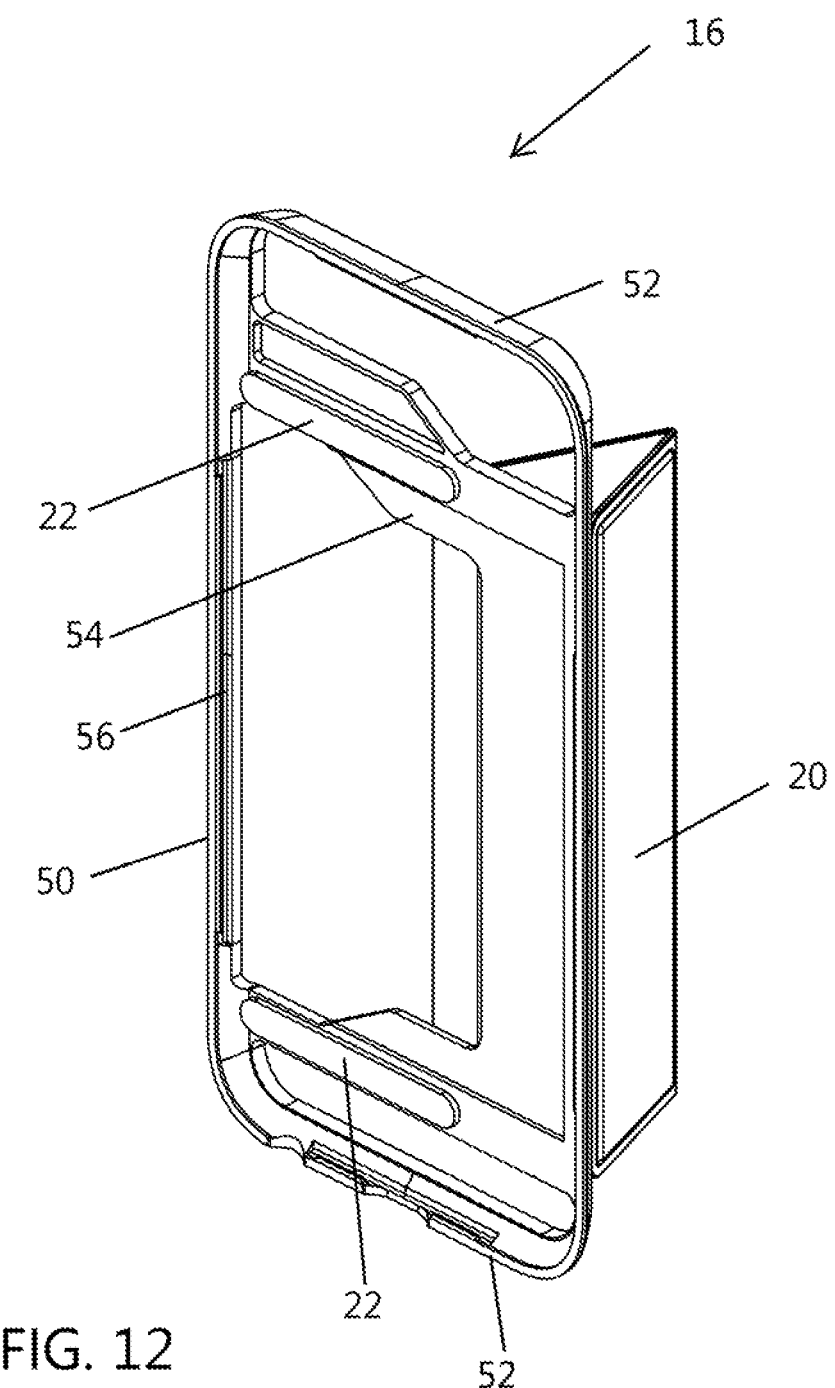
FIG. 12 is a front upper perspective view of an outer member of the carrying case in accordance with the present invention.

FIGS. 10-12 illustrates the rigid body 16 of the protective covering or case 10 of the present invention. The rigid body 16 is shown with the multi hinged panel 20 attached thereto. Those skilled in the art will appreciate the panel 20 may be formed integral with the rigid body 16, may be permanently attached to the rig body 18 or may be removably attached to the rigid body 16. The rigid body 16 includes sides 50 and ends 52 that have a perimeter edging 58. The perimeter edging extends upward from an inner surface of the rigid body 14. A plurality of tabs 56 extend inward from the perimeter edging 58 toward a center of the rigid body 14. The perimeter edging 58 and tabs 56 are adapted to align and engage sides of the pliable body. The rigid body 14 further includes an opening 26 extending through the rigid body 14 between the inner and outer surfaces of the rigid body and extending through a portion of the rigid body to align with the second cavity 40 of the pliable body 18. The opening may be sized smaller than the cavity 40 and an edge of the opening may form a flange 54 that supports the panel 20. The flange 54 may include a variety of sizes and shapes some of which will be described below in greater detail.

Figure 13:
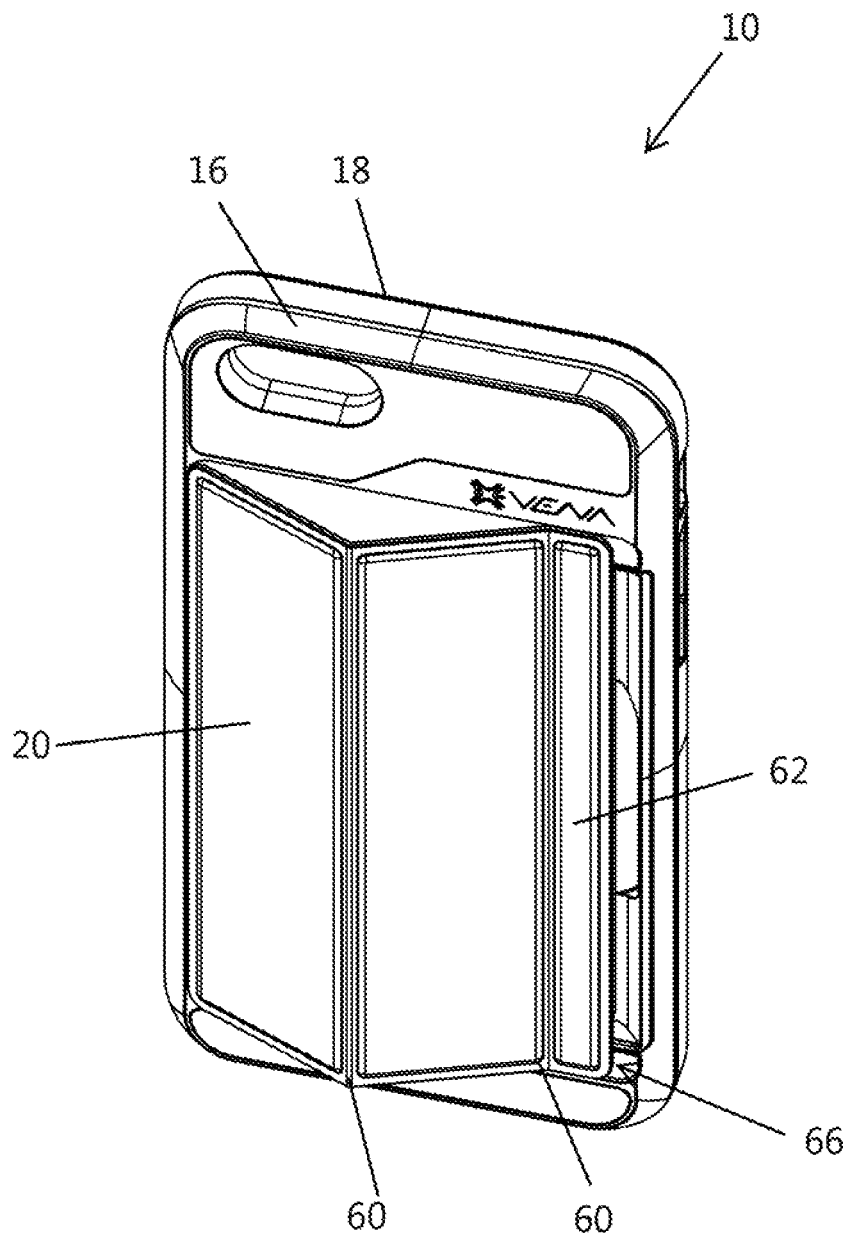
FIG. 13 is a front upper perspective view of a carrying case in accordance with the present invention illustrating the stand in a partially opened position.
Figure 14:
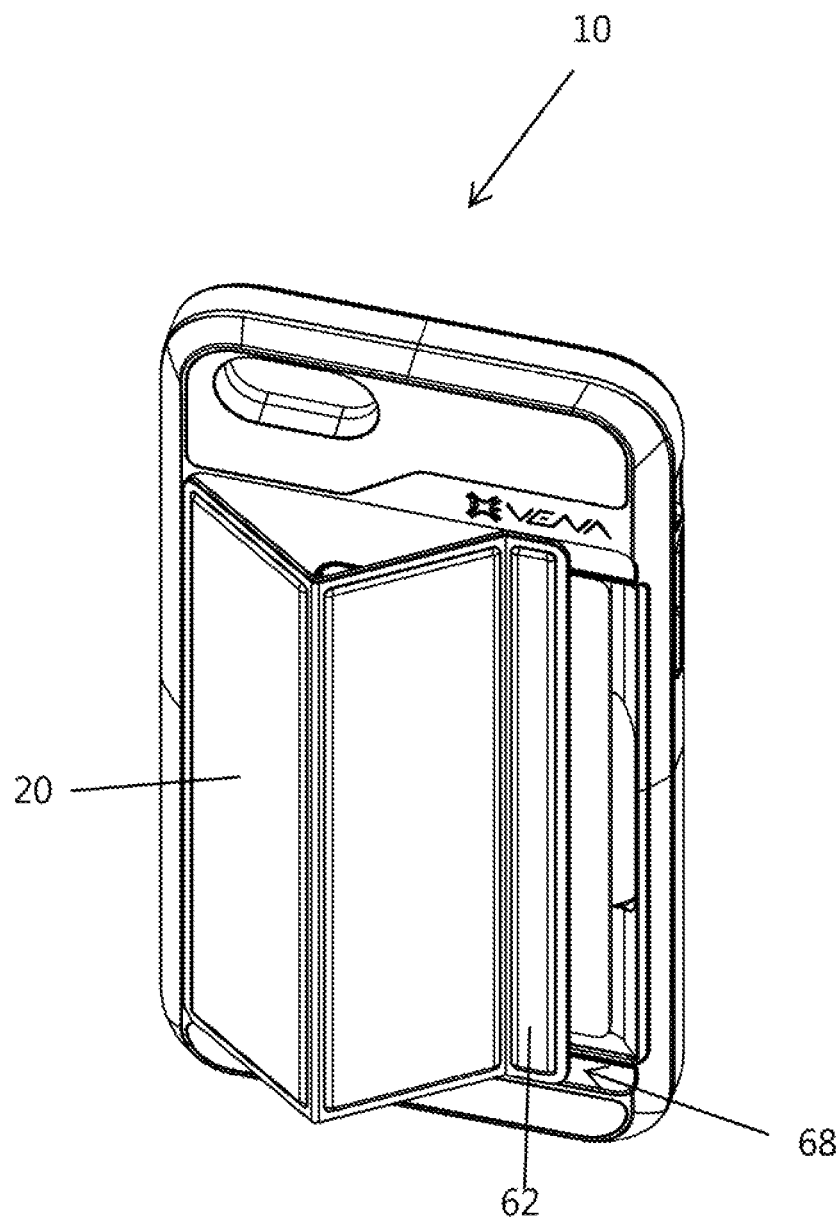
FIG. 14 is a front upper perspective view of a carrying case in accordance with the present invention illustrating the stand in a partially opened position.
Figure 15:
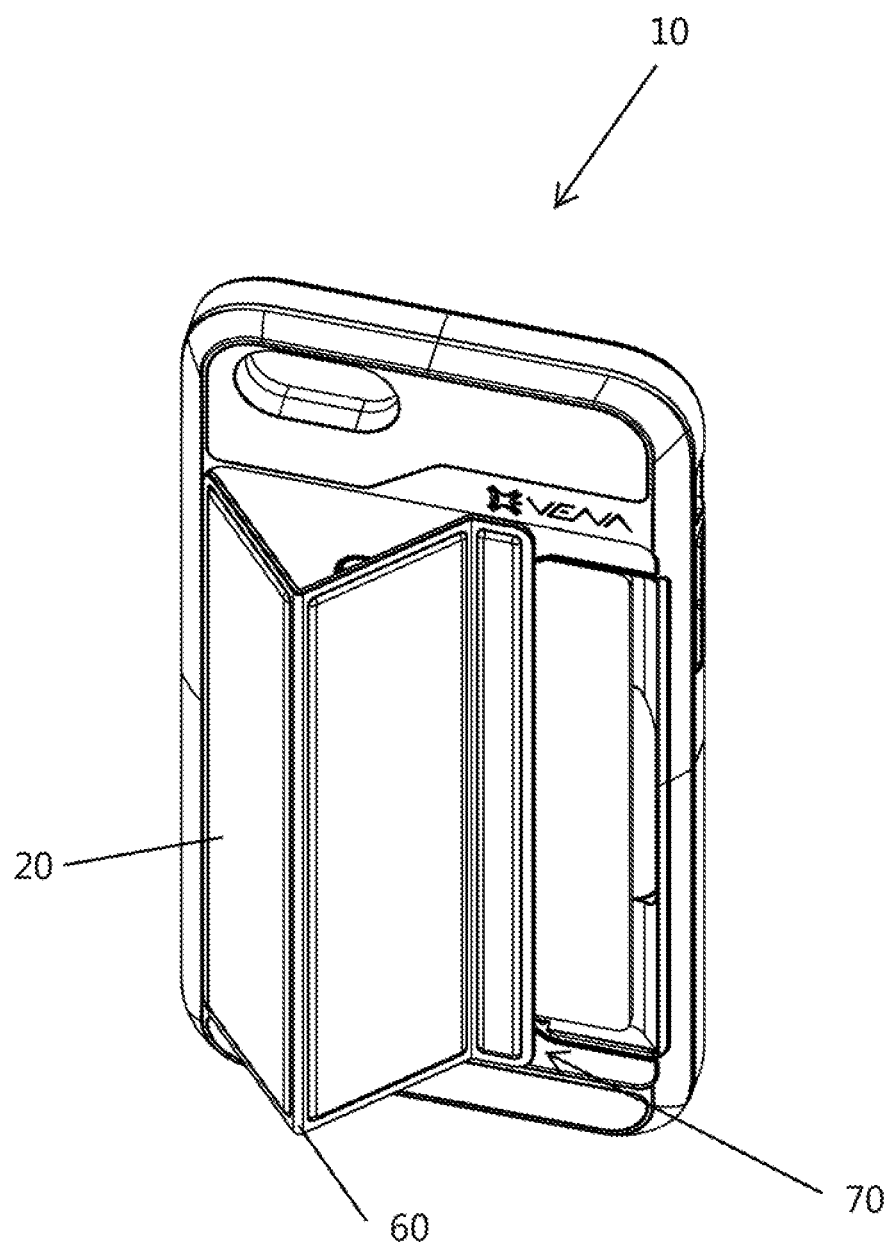
FIG. 15 is a front upper perspective view of a carrying case in accordance with the present invention illustrating the stand in a partially opened position.
Figure 16:
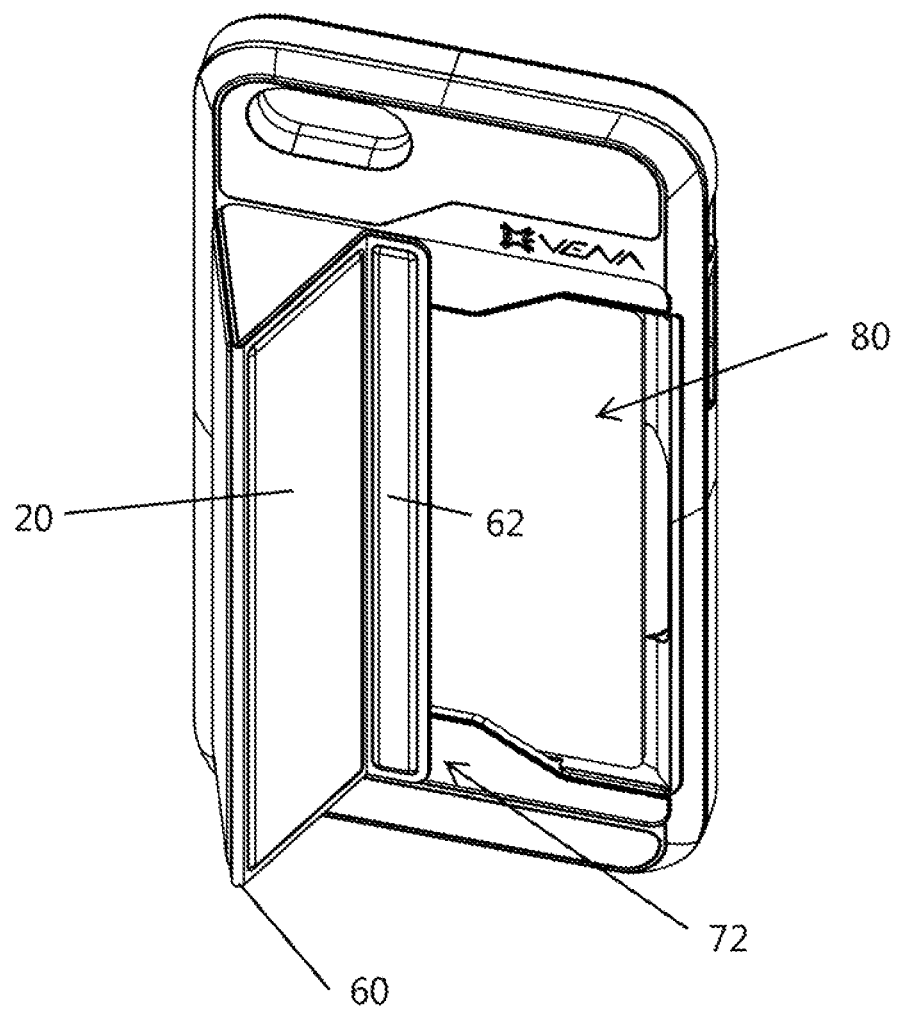
FIG. 16 is a front upper perspective view of a carrying case in accordance with the present invention illustrating the stand in a partially opened position.

FIGS. 13-16 illustrates the multiple positions of the hinged panel or flap 20 that may be utilized to vary the angle of the display screen of the mobile device 14 when propped on a flat surface. By way of example, without limitation intended, hinge or fold 60 may be used as a point of contact along with one of the parallel side edges of the rigid body 16. Depending upon which side the user chooses to rest against the flat surface the viewing angle may range from 15-45 degrees from vertical or from 20-25 degrees from a horizontal viewing angle. For example the viewing angle shown in FIG. 13 is approximately 45 degrees from vertical or 20 degrees from horizontal, while the viewing angle depicted in FIG. 16 would be approximately 15 degrees from vertical or approximately 25 degrees from horizontal.

Figure 17:
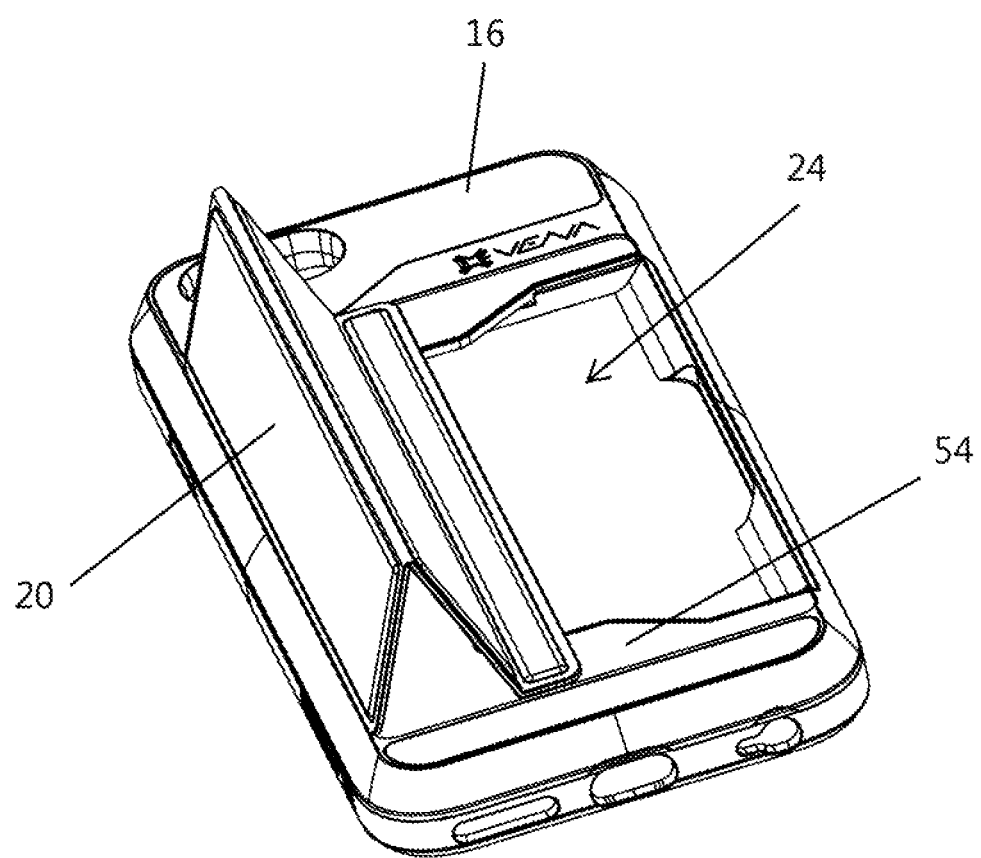
FIG. 17 is a front side perspective view of a carrying case in accordance with the present invention illustrating the stand in a fully open and engaged position without cards inserted in the back compartment.
Figure 18:
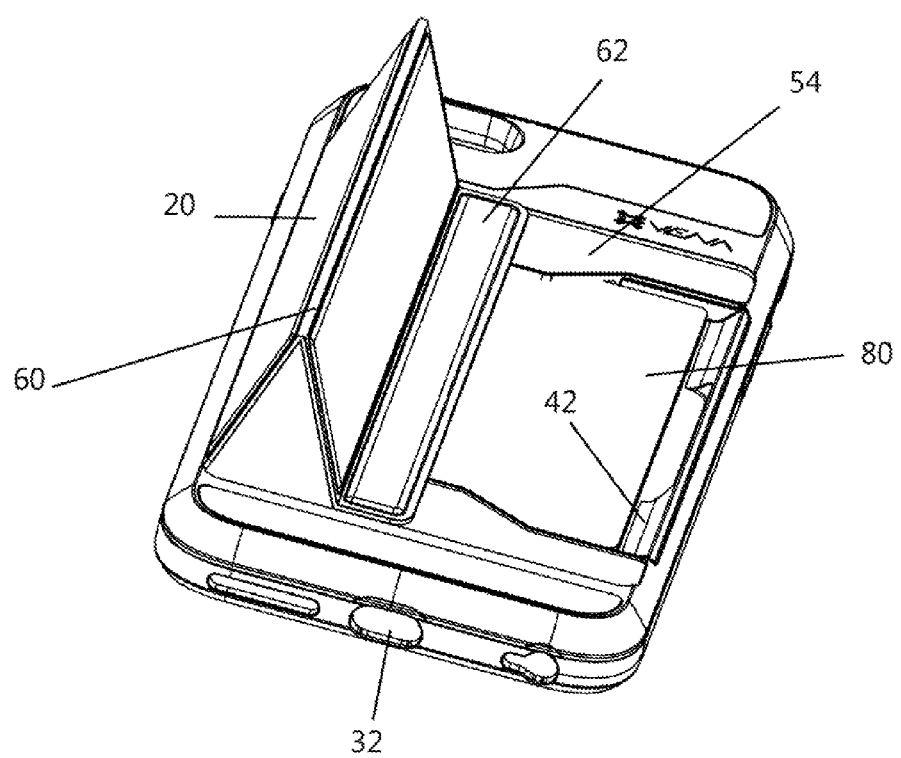
FIG. 18 is a front side perspective view of a carrying case in accordance with the present invention illustrating the stand in a fully open and engaged position without cards inserted in the back compartment.
Figure 19:
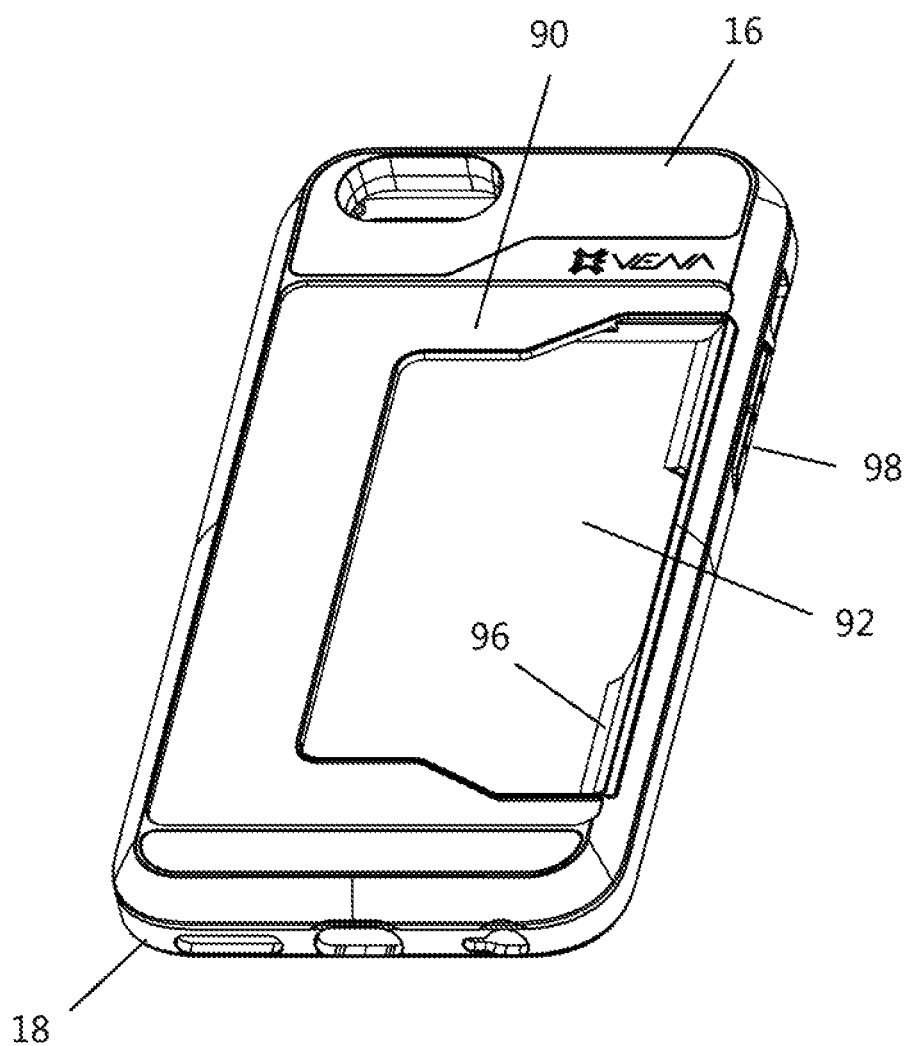
FIG. 19 is a front side perspective view of a carrying case in accordance with the present invention illustrating the stand removed.
Figure 20:
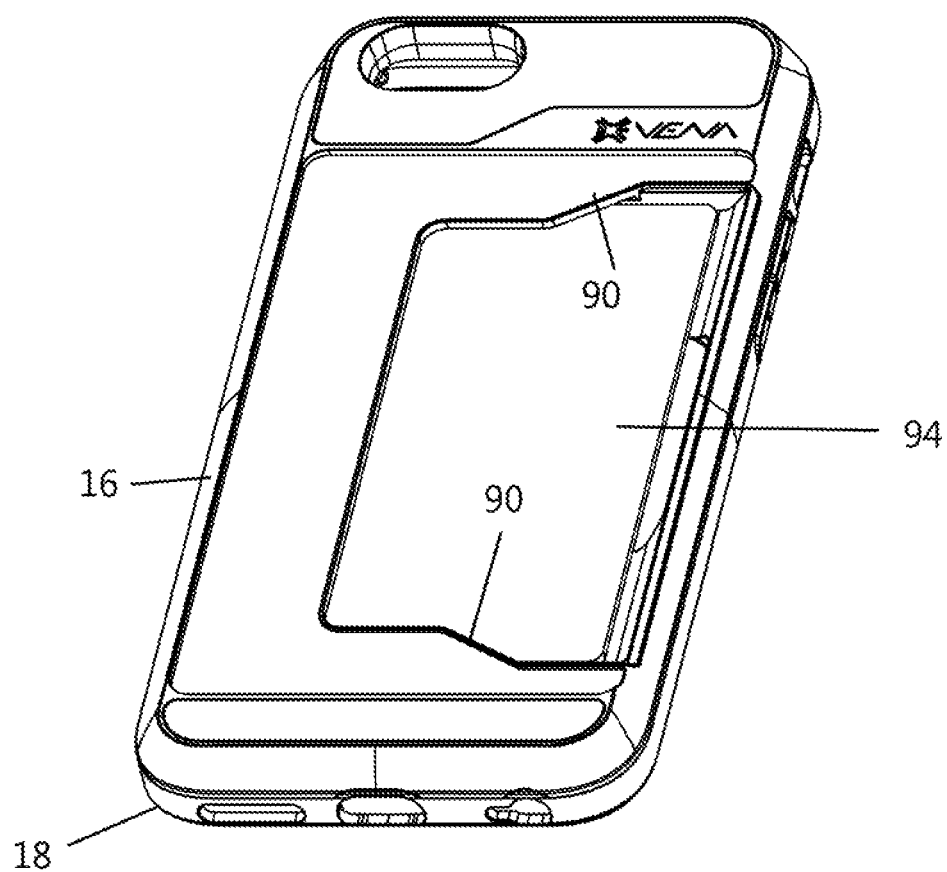
FIG. 20 is a front side perspective view of a carrying case in accordance with the present invention illustrating the stand removed and a card inserted in the compartment.
Figure 21:
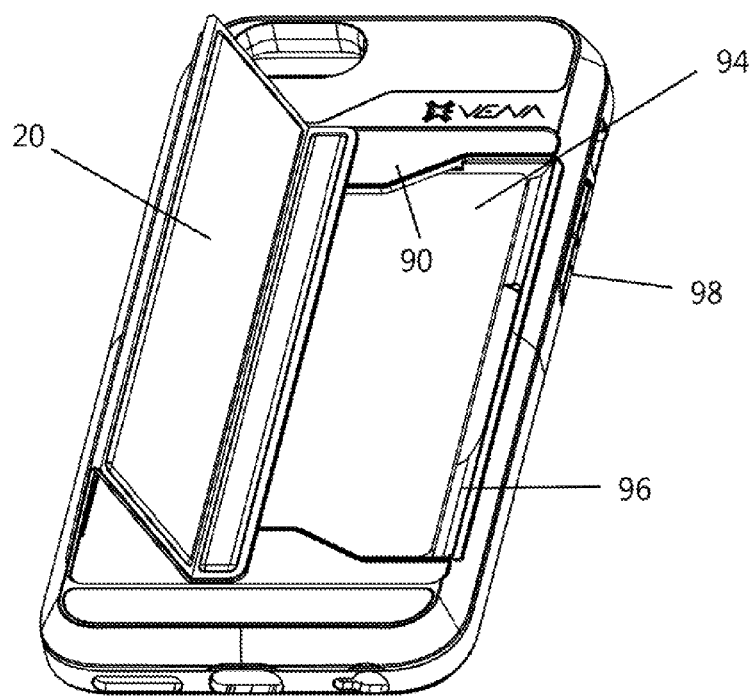
FIG. 21 is a front side perspective view of a carrying case in accordance with the present invention illustrating the stand in an open position and a card inserted in the compartment.

FIGS. 17-18 illustrates the concealed storage compartment 24 with and without a credit card 80 stowed in the storage compartment. To access the card 80 the user slides the panel 20 along flanges 54 to an open position that exposes the credit card. The user may then push or slide an edge of the card up ramp 42 to slide the card under the flange 54 and out of the storage compartment 24.

Figure 22:
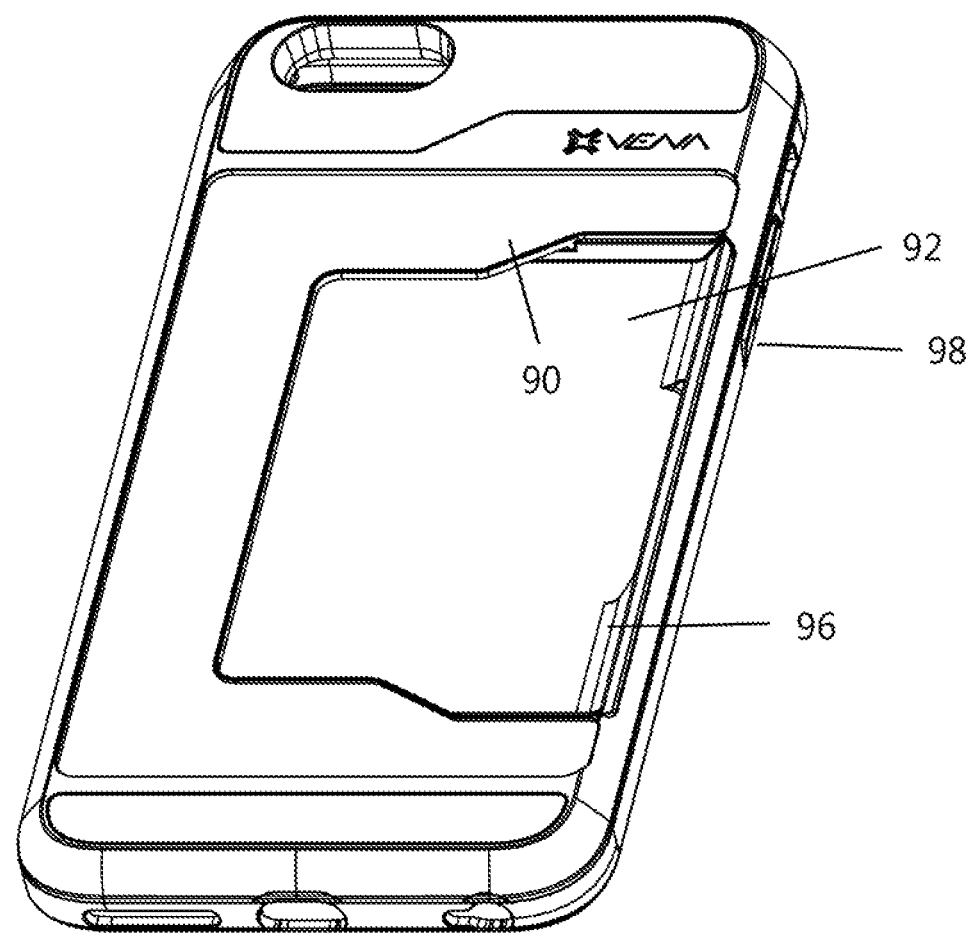
FIG. 22 is a front side perspective view of a carrying case in accordance with the present invention illustrating the stand removed.
Figure 23:
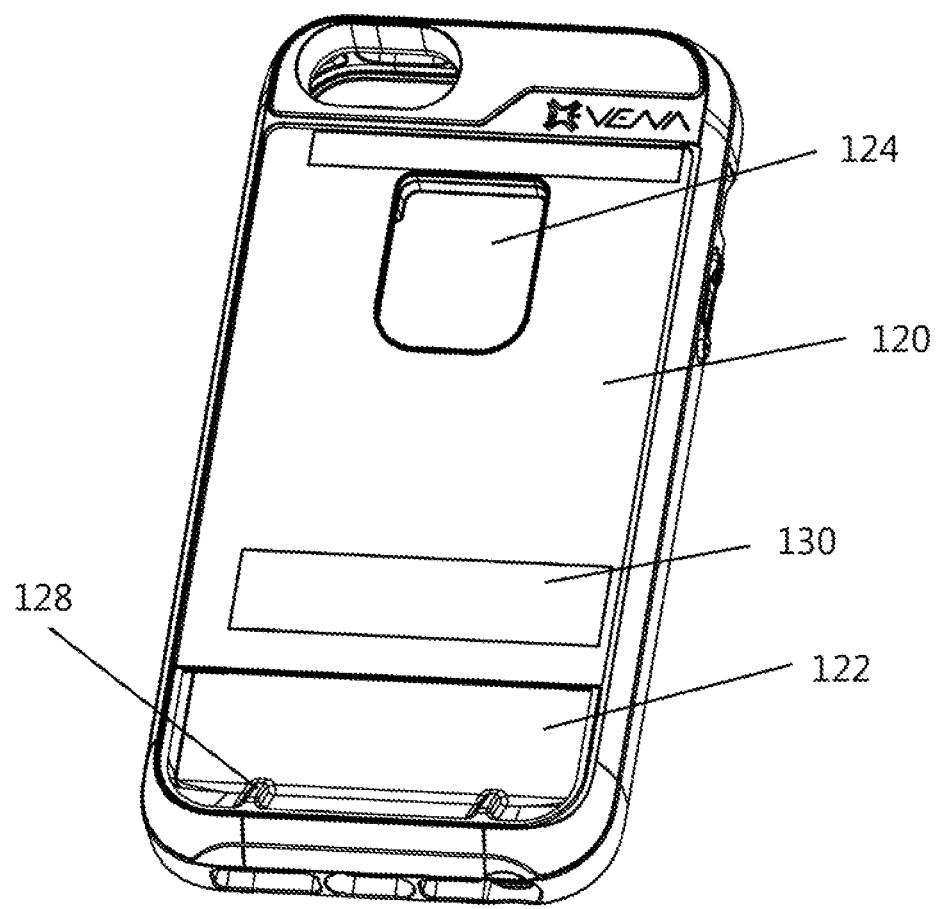
FIG. 23 is a front side perspective view of a carrying case in accordance with the present invention illustrating the stand removed.
Figure 24:
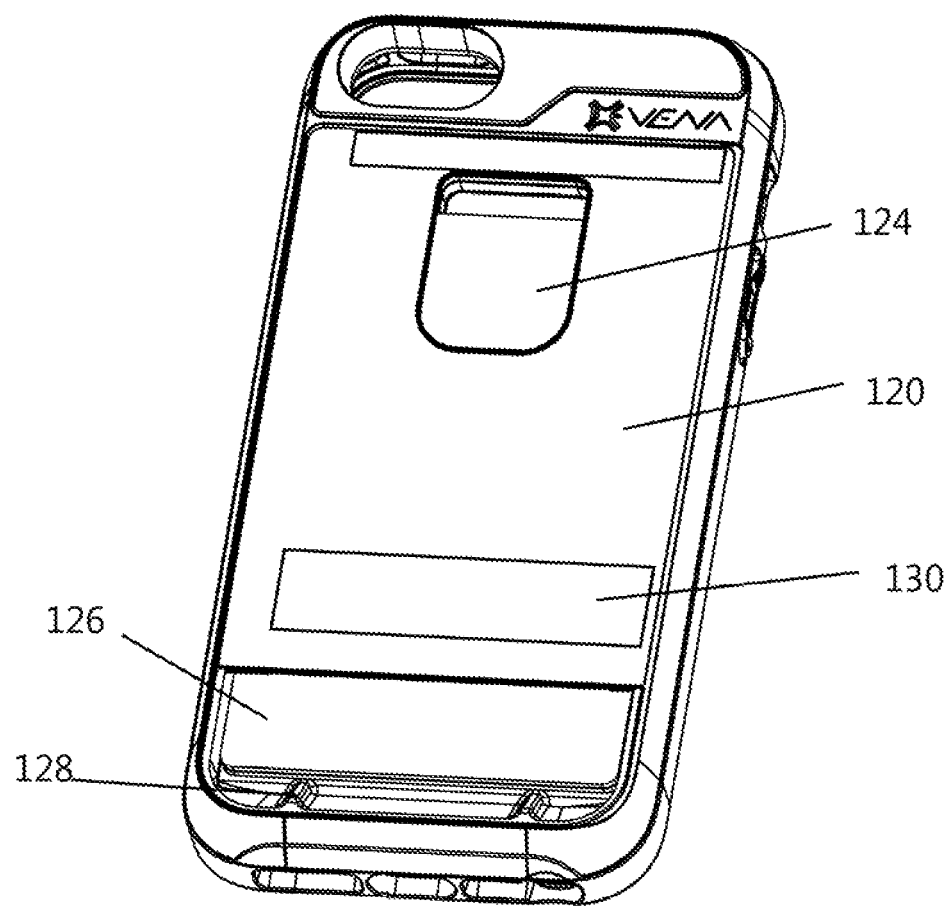
FIG. 24 is a front side perspective view of a carrying case in accordance with the present invention illustrating the stand removed and a card inserted in the compartment.
Figure 25:
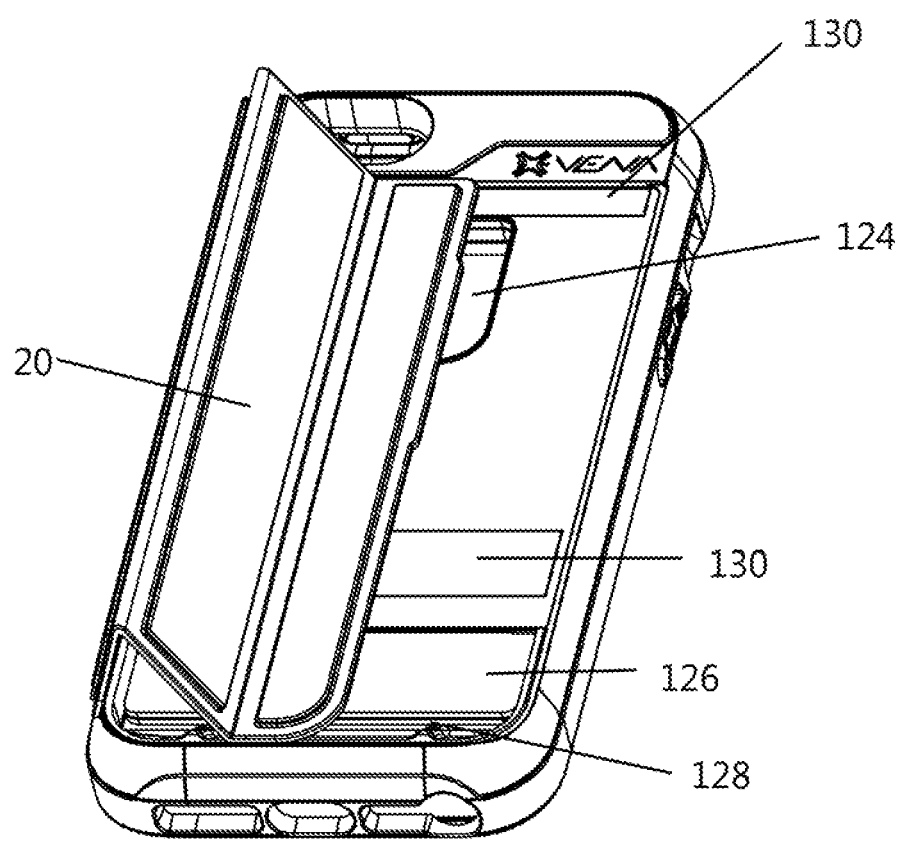
FIG. 25 is a front side perspective view of a carrying case in accordance with the present invention illustrating the stand in an open position and a card inserted in the compartment.
Figure 26:
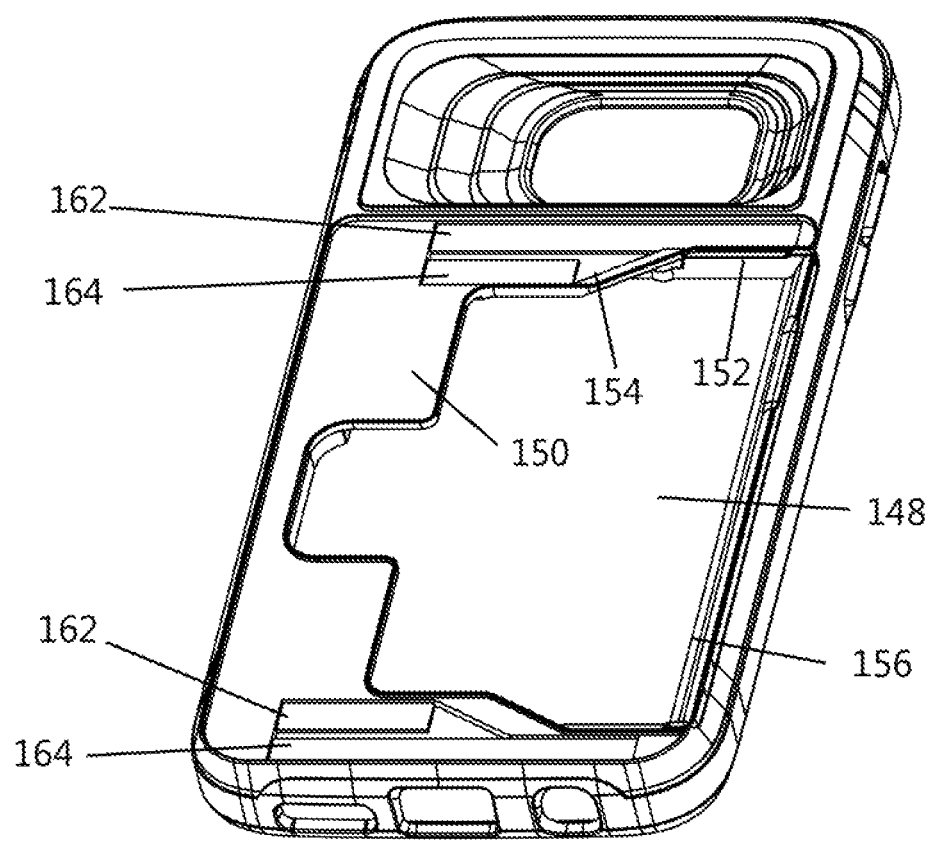
FIG. 26 is a front side perspective view of a carrying case in accordance with the present invention illustrating the stand removed.
Figure 27:
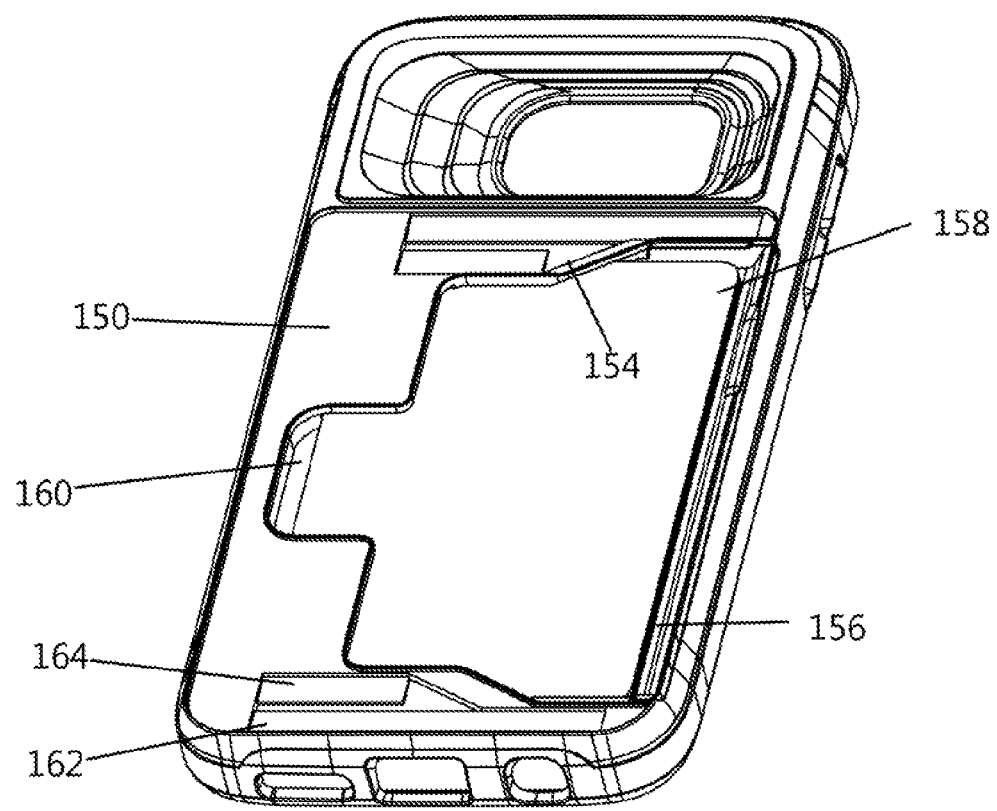
FIG. 27 is a front side perspective view of a carrying case in accordance with the present invention illustrating the stand removed and a card inserted in the compartment.
Figure 28:
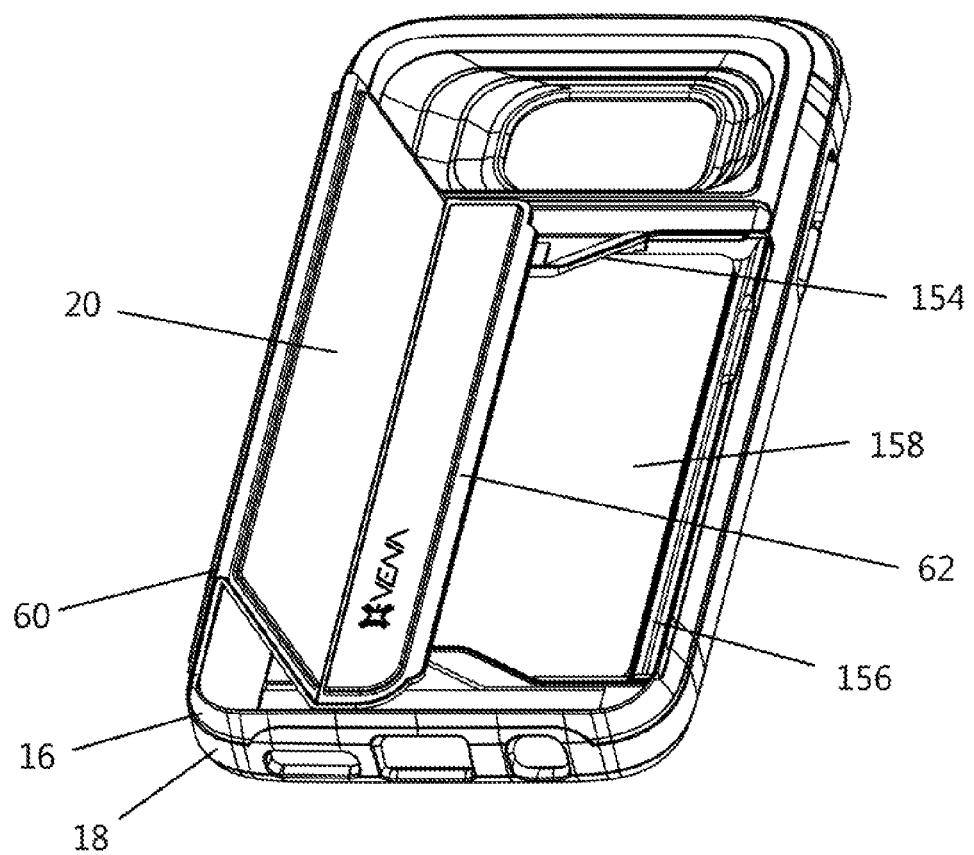
FIG. 28 is a front side perspective view of a carrying case in accordance with the present invention illustrating the stand in an open position and a card inserted in the compartment.

Various configurations of the flange and cavity are illustrated in FIGS. 19-28. With reference to FIGS. 19-22, an embodiment of the rigid body 16 of the present invention is illustrated having a flange 90 configured to expose most of the cavity 92. The cavity 92 includes ramp 96 to guide card 94 out of the cavity 90. FIG. 22 illustrates a similar cavity structure 90 but having control buttons 98 aligned in a slightly different position along the side of the protective case 10. FIGS. 23-25 illustrates an arrangement of flange 120 extending across and enclosing access to most of cavity 122. A thumb cutout 138 provides access to card 126 to push card 126 up ramp 128 and out of the storage compartment. A magnetic strip 130 is provided that cooperates with magnetic or metal strips in the panel 20 to retain the panel in a fixed desired position. FIGS. 26-28 illustrates a flange 150 configured to expose most of the cavity 148. The flange 150 includes narrow portions 152 near or adjacent ramp 156. The flange extends along the sides of the cavity 148 towards the back of the cavity. The flange 150 widens at tapered portion 154 and then extends across the entire cavity 148 towards the back portion of the cavity which is proximate the hinge joint between the panel 20 and rigid body 16. The portion of the flange extending across the cavity includes a thumb cutout 160 that exposes the card 158 allowing a user to slide card 158 up the ramp 156 and out of the storage compartment. Magnets 162 and 164 are provided that cooperate with magnetic or metal strips in panel 20 to retain the panel in a fixed desired position. The panel 20 may be fixed in multiple open or partially closed positions. The panel 20 is shown in an open position that would allow a user to rest the panel hinge 60 against a flat surface to create a viewing angle of approximately 15 degrees from vertical or 25 degrees from the horizontal viewing angle.

The various embodiments described herein are illustrative of the present invention and not limiting as to the scope and spirit of the present invention. These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A protective covering for an electronic device, said covering comprising:
  a rigid body;
  a pliable body having a first cavity formed into a first side of said pliable body and a second cavity formed into a second side of said pliable body; said first side opposes said second side; said first and second cavity separated by a dividing wall, wherein said first cavity is adapted for receiving an electronic device and said second cavity is adapted for receiving one or more articles;
  said rigid body couples to the second side of said pliable body; and
  a hinged panel stand having a first end portion fixed to an outer surface of said rigid body and a second free end portion that is adapted to extend over and cover said second cavity;
  wherein the hinged panel includes a plurality of hinged folds.

2. The protective covering as recited in claim 1, further including buffering slotted corners formed in said pliable body.

3. The protective covering as recited in claim 1, further including magnets associated with one of said hinged panel and said rigid body.

4. The protective covering as recited in claim 3, further including metal strips associated with said hinged panel.

5. The protective covering as recited in claim 1, wherein said hinged folds are defined by a plurality of hinged joints.

6. The protective covering as recited in claim 1, further including flanges blocking outer access to a portion of said second cavity.

7. The protective covering as recited in claim 6 further including a ramped side of said second cavity.

8. The protective covering as recited in claim 7, further including cushioning members formed in said pliable body and adapted to align with a camera aperture of the electronic device.

9. The protective covering as recited in claim 7, wherein said ramped side is formed on at least one of a bottom side, right side and left side of said second cavity.

10. A protective covering for a mobile electronic device configured to be user removable from said mobile device, wherein said mobile device includes a thickness that is defined as the distance between a front face and a back face of the mobile device, and a perimeter that is defined by a top side, bottom side, right side, and left side extending between the front and back faces, and corners defined at the intersecting regions of the sides, said protective covering comprising:
- a rigid body defined by inner and outer surfaces of said rigid body, said inner surface including a perimeter edging extending upward from said inner surface and a plurality of tabs extending inward from the perimeter edging toward a center of said first rigid body;
- a pliable body defined by inner and outer surfaces of said pliable body and dimensioned to cover a majority of the back face of the mobile device and extend around a majority of the perimeter of the mobile device, said pliable body further including a first cavity formed into the inner surface of said pliable body and a second cavity formed into the outer surface of the pliable body, wherein said inner surface and outer surface of the pliable body oppose each other and said first and second cavity are separated by a dividing wall, wherein said first cavity is adapted for receiving the mobile device and said second cavity is adapted for receiving one or more articles;
- said perimeter edging of said rigid body dimensioned to engage sides of said pliable body and said rigid body further including an opening extending through said rigid body between said inner and outer surfaces of said rigid body and extending through a portion of the rigid body to align with the second cavity of said pliable body; and
- a hinged panel having multiple folds formed in the panel and having a first end fixed to said rigid body, said panel being dimensioned to cover the opening extending through the rigid body.

11. The protective covering as recited in claim 10, wherein said pliable body includes one or more control apertures extending through the pliable body, said apertures dimensioned and positioned to allow access to control ports on the mobile device.

12. The protective covering as recited in claim 10, said pliable body including sides having slots formed in the sides, wherein said slots are dimensioned and positioned to align and engage with said tabs of said rigid body.

13. The protective covering as recited in claim 10, said pliable body having indentations aligned with corners of the mobile device, said indentations being dimensioned to increase a pliability of the pliable body near the corners of the mobile device.

14. The protective covering as recited in claim 10, wherein said rigid body is made of a first material that has a first hardness and said pliable body is made of a second material that has a second hardness, wherein said first hardness is greater than said second hardness.

15. The protective covering as recited in claim 10, further including channels formed and extending into said inner surface of said pliable body, wherein said channels are aligned to extend around at least a portion of a camera aperture of said mobile device.

16. The protective covering as recited in claim 10, further including at least one of magnets and metal strips associated with a second end portion of said hinged panel.

17. The protective covering as recited in claim 16, further including magnets associated with the outer surface of said rigid body.

18. The protective covering as recited in claim 10, further including flanges blocking outer access to a portion of said second cavity.

19. The protective covering as recited in claim 18, further including ramped sides of second cavity.

20. The protective covering as recited in claim 19, further including slots formed in the sides of said pliable body, wherein said slots are dimensioned to receive at least a portion of said tabs of said rigid body.

* * * * *